US012659143B2

(12) United States Patent
Kim et al.

(10) Patent No.: US 12,659,143 B2
(45) Date of Patent: Jun. 16, 2026

(54) METHOD AND DEVICE FOR CORRECTING POLARIZATION DISTORTION OF FARADAY ROTATOR MIRROR FOR QUANTUM KEY DISTRIBUTION IN COMMUNICATION SYSTEM

(71) Applicant: LG ELECTRONICS INC., Seoul (KR)

(72) Inventors: Jayeong Kim, Seoul (KR); Sangrim Lee, Seoul (KR); Hojae Lee, Seoul (KR); Byungkyu Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 542 days.

(21) Appl. No.: 18/044,167

(22) PCT Filed: Oct. 27, 2021

(86) PCT No.: PCT/KR2021/015239
§ 371 (c)(1),
(2) Date: Mar. 6, 2023

(87) PCT Pub. No.: WO2022/092815
PCT Pub. Date: May 5, 2022

(65) Prior Publication Data
US 2024/0007278 A1    Jan. 4, 2024

(30) Foreign Application Priority Data

Oct. 30, 2020    (KR) ........................ 10-2020-0143531

(51) Int. Cl.
*H04L 9/00*        (2022.01)
*G02F 1/09*        (2006.01)
(Continued)

(52) U.S. Cl.
CPC .............. *H04L 9/0858* (2013.01); *G02F 1/09* (2013.01); *H04B 10/079* (2013.01); *H04B 10/508* (2013.01)

(58) Field of Classification Search
CPC . H04L 9/0858; H04L 2209/80; H04L 9/0852; G02F 1/09; H04B 10/079;
(Continued)

(56) References Cited

U.S. PATENT DOCUMENTS

2007/0076888 A1*  4/2007  Kuang .................. H04L 9/0858
                                                  380/278
2007/0110242 A1   5/2007  Tomita et al.
(Continued)

FOREIGN PATENT DOCUMENTS

CN          109067518 A  * 12/2018  ........... H04L 9/0858
KR     10-2020-0035479      4/2020
WO        2014-069773       5/2014

OTHER PUBLICATIONS

"Daschner, Exploiting Faraday rotation to jam quantum key distribution via polarized photons", 2019, arXiv preprint arXiv, pp. 1-8 (Year: 2019).*
(Continued)

*Primary Examiner* — Kevin Ayala
(74) *Attorney, Agent, or Firm* — LEE, HONG, DEGERMAN, KANG & WAIMEY

(57)            ABSTRACT

A method of operating a terminal in a wireless communication system includes transmitting, to a second device, a random access (RA) preamble, receiving, from the second device, a random access response (RAR) message as a response to the RA preamble, performing a radio resource control (RRC) connection procedure with the second device, generating a sift key for communication with the second
(Continued)

device, and performing communication through a radio channel with the second device using the sift key.

20 Claims, 21 Drawing Sheets

(51) Int. Cl.
*H04B 10/079* (2013.01)
*H04B 10/508* (2013.01)
*H04L 9/08* (2006.01)

(58) Field of Classification Search
CPC .... H04B 10/508; H04B 10/70; H04B 10/503; G02B 27/28
See application file for complete search history.

(56) References Cited

U.S. PATENT DOCUMENTS

| | | | |
|---|---|---|---|
| 2016/0262047 A1 | 9/2016 | Yi et al. | |
| 2018/0183767 A1* | 6/2018 | Ryoo | H04L 63/0428 |
| 2020/0067601 A1* | 2/2020 | Kikawada | H04B 10/506 |
| 2020/0118026 A1 | 4/2020 | Ashrafi | |

OTHER PUBLICATIONS

PCT International Application No. PCT/KR2021/015239, International Search Report dated Jan. 27, 2022, 16 page.
Daschner et al., "Exploiting Faraday Rotation to Jam Quantum Key Distribution via Polarized Photons," arXiv:1905.01359v1, May 2019, 9 pages.

* cited by examiner

TERMINAL(2510)                    BASE STATION(2520)

RA PREAMBLE(S2501)

RAR MESSAGE(S2503)

RRC CONNECTION PROCEDURE(S2505)

GENERATE AND SHARE SIFT KEY(S2507)

PERFORM COMMUNICATION BASED ON SIFT KEY(S2509)

METHOD AND DEVICE FOR CORRECTING POLARIZATION DISTORTION OF FARADAY ROTATOR MIRROR FOR QUANTUM KEY DISTRIBUTION IN COMMUNICATION SYSTEM

CROSS-REFERENCE TO RELATED APPLICATION(S)

This application is the National Stage filing under 35 U.S.C. 371 of International Application No. PCT/KR2021/015239, filed on Oct. 27, 2021, which claims the benefit of earlier filing date and right of priority to Korean Application No. 10-2020-0143531, filed on Oct. 30, 2020, the contents of which are all hereby incorporated by reference herein in their entireties.

TECHNICAL FIELD

The following description relates to a communication system supporting quantum key distribution (QKD) and relates to a method and apparatus for correcting polarization distortion of a Faraday rotator mirror.

BACKGROUND

Radio access systems have come into widespread in order to provide various types of communication services such as voice or data. In general, a radio access system is a multiple access system capable of supporting communication with multiple users by sharing available system resources (bandwidth, transmit power, etc.). Examples of the multiple access system include a code division multiple access (CDMA) system, a frequency division multiple access (FDMA) system, a time division multiple access (TDMA) system, a single carrier-frequency division multiple access (SC-FDMA) system, etc.

In particular, as many communication apparatuses require a large communication capacity, an enhanced mobile broadband (eMBB) communication technology has been proposed compared to radio access technology (RAT). In addition, not only massive machine type communications (MTC) for providing various services anytime anywhere by connecting a plurality of apparatuses and things but also communication systems considering services/user equipments (UEs) sensitive to reliability and latency have been proposed. To this end, various technical configurations have been proposed.

SUMMARY

The present disclosure may provide an apparatus and method for more effectively performing quantum key distribution using a Faraday rotator mirror in a communication system.

The present disclosure may provide an apparatus and method for estimating a rotation angle error of a Faraday rotator mirror in a communication system.

The present disclosure may provide an apparatus and method for correcting a rotation angle error of a Faraday rotator mirror in a communication system.

The present disclosure may provide an apparatus and method for estimating and correcting a rotation angle error of a Faraday rotator mirror without an additional quantum pulse in a communication system.

The present disclosure may provide an apparatus and method for generating a control signal for adjusting a rotation angle of a Faraday rotator mirror used to generate a quantum key in a communication system.

The present disclosure may provide an apparatus and method for generating a control signal for adjusting a rotation angle of a Faraday rotator mirror used to generate a quantum key in a communication system.

The present disclosure may provide an apparatus and method for estimating and correcting a rotation angle error of a Faraday rotator mirror using a quantum pulse received to generate a sift key in a communication system.

The present disclosure may provide an apparatus and method for performing communication based on a sift key determined using a Faraday rotator mirror corrected in consideration of a rotation angle error in a communication system.

The technical objects to be achieved in the present disclosure are not limited to the above-mentioned technical objects, and other technical objects that are not mentioned may be considered by those skilled in the art through the embodiments described below.

As an example of the present disclosure, a method performed by a first device in a communication system may comprise transmitting, to a second device, a random access (RA) preamble, receiving, from the second device, a random access response (RAR) message as a response to the RA preamble, performing a radio resource control (RRC) connection procedure with the second device, generating a sift key for communication with the second device, and performing communication through a radio channel with the second device using the sift key. The generating the sift key may comprise receiving a pulse for cryptographic key exchange through a quantum channel, encoding and transmitting bit information in the pulse after the pulse is reflected from a Faraday rotator mirror, measuring a rotation angle error of the Faraday rotator mirror using a first component and a second component split from the pulse, and adjusting a magnetic intensity of the Faraday rotator mirror using the rotation angle error. The first component may be obtained from a pulse before being reflected from the Faraday rotator mirror, and the second component may be obtained from a pulse after being reflected from the Faraday rotator mirror.

As an example of the present disclosure, a first device in a communication system may comprise a transceiver and a processor connected to the transceiver. The processor may transmit, to a second device, a random access (RA) preamble, receive a random access response (RAR) message from the second device as a response to the RA preamble, perform a radio resource control (RRC) connection procedure with the second device, generate a sift key for communication with the second device, and perform communication through a radio channel with the second device using the sift key. In order to generate the sift key, the processor may receive a pulse for cryptographic key exchange through a quantum channel, encode and transmit bit information in the pulse after the pulse is reflected from a Faraday rotator mirror, measure a rotation angle error of the Faraday rotator mirror using a first component and a second component split from the pulse, and adjust a magnetic intensity of the Faraday rotator mirror using the rotation angle error. The first component may be obtained from a pulse before being reflected from the Faraday rotator mirror, and the second component may be obtained from a pulse after being reflected from the Faraday rotator mirror.

As an example of the present disclosure, a device may comprise at least one processor and at least one computer memory connected to the at least one processor and configured to store instructions instructing operations as being executed by the at least one processor. The operations may enable the device to transmit, to another device, a random access (RA) preamble, to receive, from the other device, a random access response (RAR) message as a response to the RA preamble, to perform a radio resource control (RRC) connection procedure with the other device, to generate a sift key for communication with the other device and to perform communication through a radio channel with the other device using the sift key. The generating the sift key may comprise receiving a pulse for cryptographic key exchange through a quantum channel, encoding and transmitting bit information in the pulse after the pulse is reflected from a Faraday rotator mirror, measuring a rotation angle error of the Faraday rotator mirror using a first component and another component split from the pulse, and adjusting a magnetic intensity of the Faraday rotator mirror using the rotation angle error. The first component may be obtained from a pulse before being reflected from the Faraday rotator mirror, and the other component may be obtained from a pulse after being reflected from the Faraday rotator mirror.

As an example of the present disclosure, a non-transitory computer-readable medium storing at least one instruction may comprise the at least instruction executable by a processor. The at least one instruction may control a device to transmit, to a second device, a random access (RA) preamble, to receive a random access response (RAR) message from the second device as a response to the RA preamble, to perform a radio resource control (RRC) connection procedure with the second device, to generate a sift key for communication with the second device and to perform communication through a radio channel with the second device using the sift key. In order to generate the sift key, the at least one instruction may perform control to receive a pulse for cryptographic key exchange through a quantum channel, to encode and transmit bit information in the pulse after the pulse is reflected from a Faraday rotator mirror, to measure a rotation angle error of the Faraday rotator mirror using a first component and a second component split from the pulse and to adjust a magnetic intensity of the Faraday rotator mirror using the rotation angle error. The first component may be obtained from a pulse before being reflected from the Faraday rotator mirror, and the second component may be obtained from a pulse after being reflected from the Faraday rotator mirror.

The above-described aspects of the present disclosure are merely some of the preferred embodiments of the present disclosure, and various embodiments reflecting the technical features of the present disclosure may be derived and understood by those of ordinary skill in the art based on the following detailed description of the disclosure.

As is apparent from the above description, the embodiments of the present disclosure have the following effects.

According to the present disclosure, polarization distortion of a Faraday rotator mirror used for quantum key distribution (QKD) can be effectively corrected.

It will be appreciated by persons skilled in the art that that the effects that can be achieved through the embodiments of the present disclosure are not limited to those described above and other advantageous effects of the present disclosure will be more clearly understood from the following detailed description. That is, unintended effects according to implementation of the present disclosure may be derived by those skilled in the art from the embodiments of the present disclosure.

BRIEF DESCRIPTION OF THE DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

DETAILED DESCRIPTION

Figure 1:
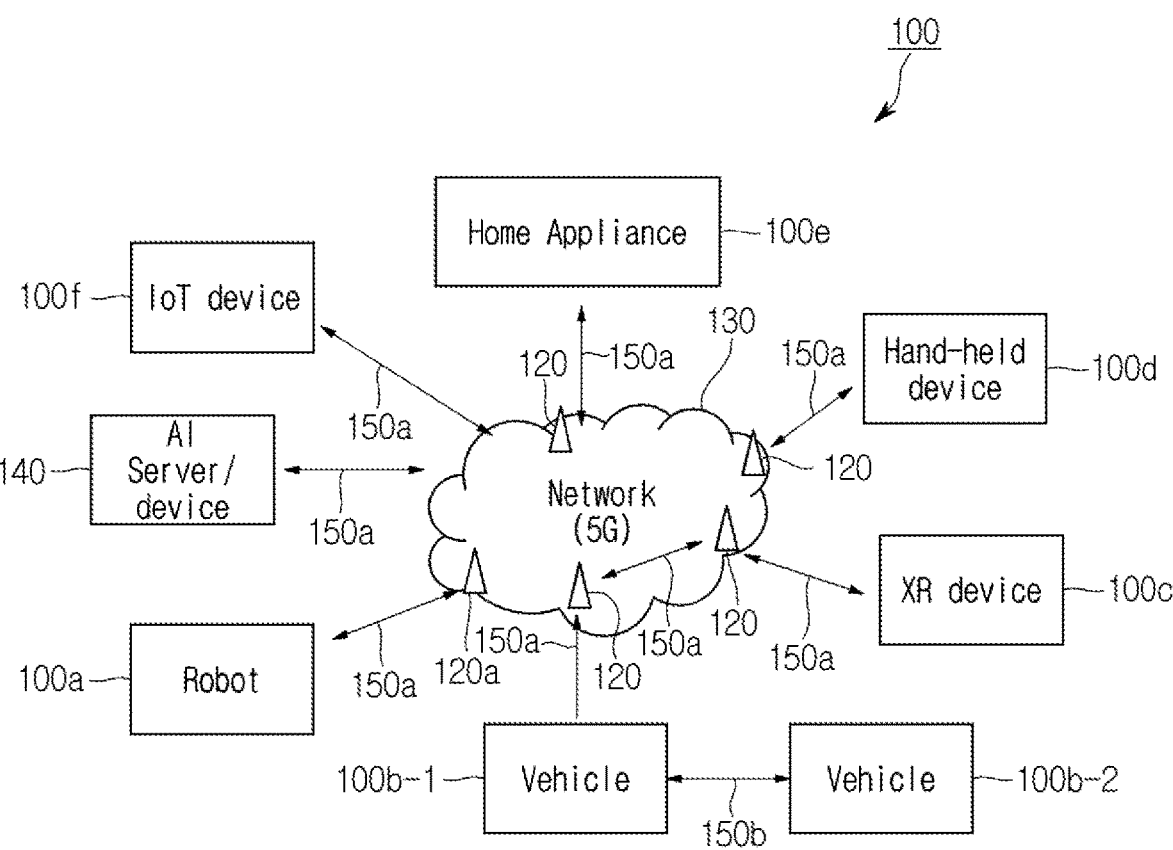
FIG. 1 illustrates an example of a communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a mobile station. ABS refers to a terminal node of a network, which directly communicates with a mobile station. A specific operation described as being performed by the BS may be performed by an upper node of the BS.

Namely, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an uplink (UL). Likewise, the mobile station may serve as a receiver and the BS may serve as a transmitter, on a downlink (DL).

The embodiments of the present disclosure may be supported by standard specifications disclosed for at least one of wireless access systems including an Institute of Electrical and Electronics Engineers (IEEE) 802.xx system, a 3$^{rd}$ Generation Partnership Project (3GPP) system, a 3GPP Long Term Evolution (LTE) system, 3GPP 5$^{th}$ generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as code division multiple access (CDMA), frequency division multiple access (FDMA), time division multiple access (TDMA), orthogonal frequency division multiple access (OFDMA), single carrier frequency division multiple access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.xxx.

Communication System Applicable to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 illustrates an example of a communication system applicable to the present disclosure.

Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100a, vehicles 100b-1 and 100b-2, an extended reality (XR) device 100c, a hand-held device 100d, a home appliance 100e, an Internet of Thing (IoT) device 100f, and an artificial intelligence (AI) device/server 100g. For example, the vehicles may include a vehicle having a wireless communication function, an autonomous vehicle, a vehicle capable of performing vehicle-to-vehicle communication, etc. The vehicles 100b-1 and 100b-2 may include an unmanned aerial vehicle (UAV) (e.g., a drone). The XR device 100c includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100d may include a smartphone, a smart pad, a wearable device (e.g., a smart watch or smart glasses), a computer (e.g., a laptop), etc. The home appliance 100e may include a TV, a refrigerator, a washing machine, etc. The IoT device 100f may include a sensor, a smart meter, etc. For example, the base station 120 and the network 130 may be implemented by a wireless device, and a specific wireless device 120a may operate as a base station/network node for another wireless device.

The wireless devices 100a to 100f may be connected to the network 130 through the base station 120. AI technology is applicable to the wireless devices 100a to 100f, and the wireless devices 100a to 100f may be connected to the AI server 100g through the network 130. The network 130 may be configured using a 3G network, a 4G (e.g., LTE) network or a 5G (e.g., NR) network, etc. The wireless devices 100a to 100f may communicate with each other through the base station 120/the network 130 or perform direct communication (e.g., sidelink communication) without through the base station 120/the network 130. For example, the vehicles 100b-1 and 100b-2 may perform direct communication (e.g., vehicle to vehicle (V2V)/vehicle to everything (V2X) communication). In addition, the IoT device 100f (e.g., a sensor) may perform direct communication with another IoT device (e.g., a sensor) or the other wireless devices 100a to 100f.

Wireless communications/connections 150a, 150b and 150c may be established between the wireless devices 100a to 100f/the base station 120 and the base station 120/the base station 120. Here, wireless communication/connection may be established through various radio access technologies (e.g., 5G NR) such as uplink/downlink communication 150a, sidelink communication 150b (or D2D communication) or communication 150c between base stations (e.g., relay, integrated access backhaul (IAB). The wireless device and the base station/wireless device or the base station and the base station may transmit/receive radio signals to/from each other through wireless communication/connection 150a, 150b and 150c. For example, wireless communication/connection 150a, 150b and 150c may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Communication System Applicable to the Present Disclosure

Figure 2:
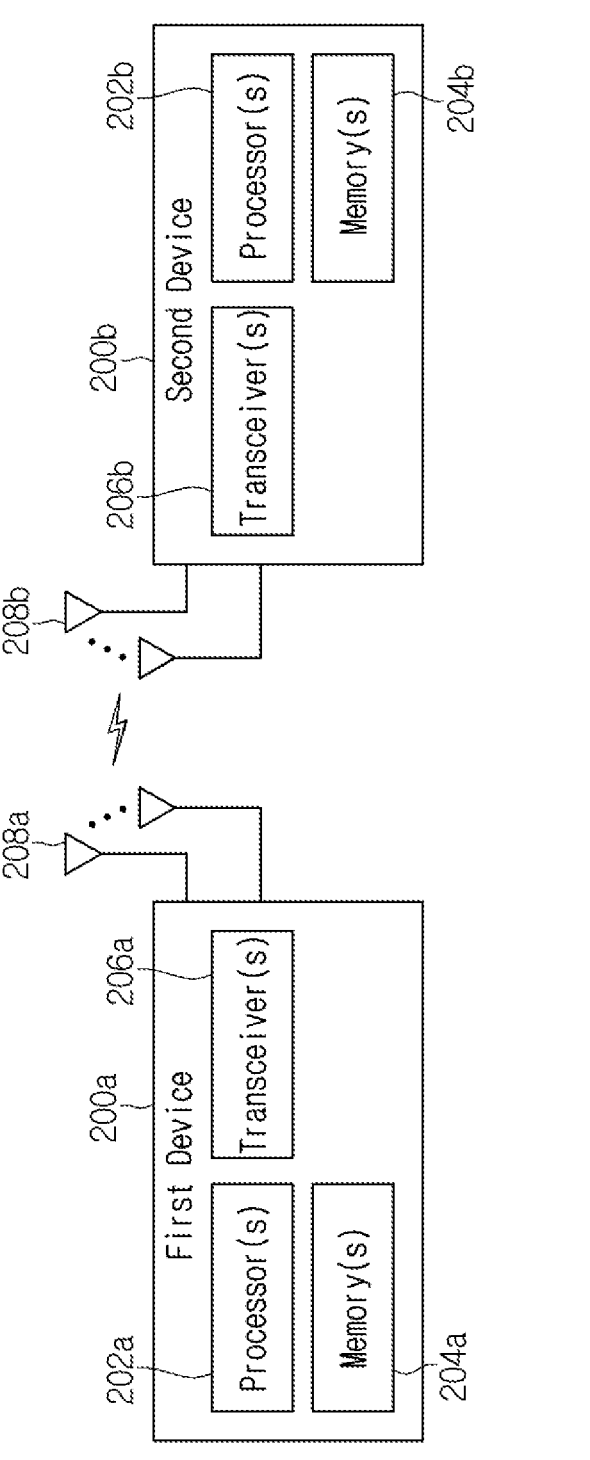
FIG. 2 illustrates an example of a wireless apparatus applicable to the present disclosure.

FIG. 2 illustrates an example of a wireless device applicable to the present disclosure.

Referring to FIG. 2, a first wireless device 200a and a second wireless device 200b may transmit and receive radio signals through various radio access technologies (e.g., LTE or NR). Here, {the first wireless device 200a, the second wireless device 200b} may correspond to {the wireless device 100x, the base station 120} and/or {the wireless device 100x, the wireless device 100x} of FIG. 1.

The first wireless device 200a may include one or more processors 202a and one or more memories 204a and may further include one or more transceivers 206a and/or one or more antennas 208a. The processor 202a may be configured to control the memory 204a and/or the transceiver 206a and to implement descriptions, functions, procedures, proposals, methods and/or operational flowcharts disclosed herein. For example, the processor 202a may process information in the memory 204a to generate first information/signal and then transmit a radio signal including the first information/signal through the transceiver 206a. In addition, the processor 202a may receive a radio signal including second information/signal through the transceiver 206a and then store information obtained from signal processing of the second information/signal in the memory 204a. The memory 204a may be coupled with the processor 202a, and store a variety of information related to operation of the processor 202a. For example, the memory 204a may store software code including instructions for performing all or some of the processes controlled by the processor 202a or performing the descriptions, functions, procedures, proposals, methods and/or operational flowcharts disclosed herein. Here, the processor 202a and the memory 204a may be part of a communication modem/circuit/chip designed to implement wireless communication technology (e.g., LTE or NR). The transceiver 206a may be coupled with the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may refer to a communication modem/circuit/chip.

The second wireless device 200b may include one or more processors 202b and one or more memories 204b and may further include one or more transceivers 206b and/or one or more antennas 208b. The processor 202b may be configured to control the memory 204b and/or the transceiver 206b and to implement the descriptions, functions, procedures, proposals, methods and/or operational flowcharts disclosed herein. For example, the processor 202b may process information in the memory 204b to generate third information/signal and then transmit the third information/signal through the transceiver 206b. In addition, the processor 202b may receive a radio signal including fourth information/signal through the transceiver 206b and then store information obtained from signal processing of the fourth information/signal in the memory 204b. The memory 204b may be coupled with the processor 202b to store a variety of information related to operation of the processor 202b. For example, the memory 204b may store software code including instructions for performing all or some of the processes controlled by the processor 202b or performing the descriptions, functions, procedures, proposals, methods and/or operational flowcharts disclosed herein. Herein, the processor 202*b* and the memory 204*b* may be part of a communication modem/circuit/chip designed to implement wireless communication technology (e.g., LTE or NR). The transceiver 206*b* may be coupled with the processor 202*b* to transmit and/or receive radio signals through one or more antennas 208*b*. The transceiver 206*b* may include a transmitter and/or a receiver. The transceiver 206*b* may be used interchangeably with a radio frequency (RF) unit. In the present disclosure, the wireless device may refer to a communication modem/circuit/chip.

Hereinafter, hardware elements of the wireless devices 200*a* and 200*b* will be described in greater detail. Without being limited thereto, one or more protocol layers may be implemented by one or more processors 202*a* and 202*b*. For example, one or more processors 202*a* and 202*b* may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202*a* and 202*b* may generate one or more protocol data units (PDUs) and/or one or more service data unit (SDU) according to the descriptions, functions, procedures, proposals, methods and/or operational flowcharts disclosed herein. One or more processors 202*a* and 202*b* may generate messages, control information, data or information according to the descriptions, functions, procedures, proposals, methods and/or operational flowcharts disclosed herein. One or more processors 202*a* and 202*b* may generate PDUs, SDUs, messages, control information, data or information according to the functions, procedures, proposals and/or methods disclosed herein and provide the PDUs, SDUs, messages, control information, data or information to one or more transceivers 206*a* and 206*b*. One or more processors 202*a* and 202*b* may receive signals (e.g., baseband signals) from one or more transceivers 206*a* and 206*b* and acquire PDUs, SDUs, messages, control information, data or information according to the descriptions, functions, procedures, proposals, methods and/or operational flowcharts disclosed herein.

One or more processors 202*a* and 202*b* may be referred to as controllers, microcontrollers, microprocessors or microcomputers. One or more processors 202*a* and 202*b* may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202*a* and 202*b*. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202*a* and 202*b* or stored in one or more memories 204*a* and 204*b* to be driven by one or more processors 202*a* and 202*b*. The descriptions, functions, procedures, proposals, methods and/or operational flowcharts disclosed herein implemented using firmware or software in the form of code, a command and/or a set of commands.

One or more memories 204*a* and 204*b* may be coupled with one or more processors 202*a* and 202*b* to store various types of data, signals, messages, information, programs, code, instructions and/or commands. One or more memories 204*a* and 204*b* may be composed of read only memories (ROMs), random access memories (RAMs), erasable programmable read only memories (EPROMs), flash memories, hard drives, registers, cache memories, computer-readable storage mediums and/or combinations thereof. One or more memories 204*a* and 204*b* may be located inside and/or outside one or more processors 202*a* and 202*b*. In addition, one or more memories 204*a* and 204*b* may be coupled with one or more processors 202*a* and 202*b* through various technologies such as wired or wireless connection.

One or more transceivers 206*a* and 206*b* may transmit user data, control information, radio signals/channels, etc. described in the methods and/or operational flowcharts of the present disclosure to one or more other apparatuses. One or more transceivers 206*a* and 206*b* may receive user data, control information, radio signals/channels, etc. described in the methods and/or operational flowcharts of the present disclosure from one or more other apparatuses. For example, one or more transceivers 206*a* and 206*b* may be coupled with one or more processors 202*a* and 202*b* to transmit/receive radio signals. For example, one or more processors 202*a* and 202*b* may perform control such that one or more transceivers 206*a* and 206*b* transmit user data, control information or radio signals to one or more other apparatuses. In addition, one or more processors 202*a* and 202*b* may perform control such that one or more transceivers 206*a* and 206*b* receive user data, control information or radio signals from one or more other apparatuses. In addition, one or more transceivers 206*a* and 206*b* may be coupled with one or more antennas 208*a* and 208*b*, and one or more transceivers 206*a* and 206*b* may be configured to transmit/receive user data, control information, radio signals/channels, etc. described in the descriptions, functions, procedures, proposals, methods and/or operational flowcharts disclosed herein through one or more antennas 208*a* and 208*b*. In the present disclosure, one or more antennas may be a plurality of physical antennas or a plurality of logical antennas (e.g., antenna ports). One or more transceivers 206*a* and 206*b* may convert the received radio signals/channels, etc. from RF band signals to baseband signals, in order to process the received user data, control information, radio signals/channels, etc. using one or more processors 202*a* and 202*b*. One or more transceivers 206*a* and 206*b* may convert the user data, control information, radio signals/channels processed using one or more processors 202*a* and 202*b* from baseband signals into RF band signals. To this end, one or more transceivers 206*a* and 206*b* may include (analog) oscillator and/or filters.

Structure of Wireless Device Applicable to the Present Disclosure

Figure 3:
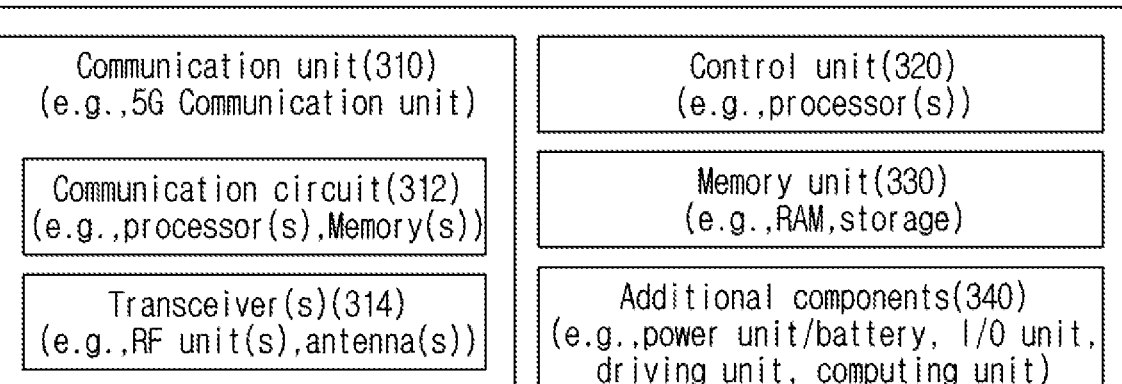
FIG. 3 illustrates another example of a wireless device applicable to the present disclosure.

FIG. 3 illustrates another example of a wireless device applicable to the present disclosure.

Referring to FIG. 3, a wireless device 300 may correspond to the wireless devices 200*a* and 200*b* of FIG. 2 and include various elements, components, units/portions and/or modules. For example, the wireless device 300 may include a communication unit 310, a control unit (controller) 320, a memory unit (memory) 330 and additional components 340. The communication unit may include a communication circuit 312 and a transceiver(s) 314. For example, the communication circuit 312 may include one or more processors 202*a* and 202*b* and/or one or more memories 204*a* and 204*b* of FIG. 2. For example, the transceiver(s) 314 may include one or more transceivers 206*a* and 206*b* and/or one or more antennas 208*a* and 208*b* of FIG. 2. The control unit 320 may be electrically coupled with the communication unit 310, the memory unit 330 and the additional components 340 to control overall operation of the wireless device. For example, the control unit 320 may control electrical/mechanical operation of the wireless device based on a program/code/instruction/information stored in the memory unit 330. In addition, the control unit 320 may transmit the information stored in the memory unit 330 to the outside (e.g., another communication device) through the wireless/wired interface using the communication unit 310 over a wireless/wired interface or store information received from the outside (e.g., another communication device) through the wireless/wired interface using the communication unit 310 in the memory unit 330.

The additional components 340 may be variously configured according to the types of the wireless devices. For example, the additional components 340 may include at least one of a power unit/battery, an input/output unit, a driving unit or a computing unit. Without being limited thereto, the wireless device 300 may be implemented in the form of the robot (FIG. 1, 100a), the vehicles (FIGS. 1, 100b-1 and 100b-2), the XR device (FIG. 1, 100c), the hand-held device (FIG. 1, 100d), the home appliance (FIG. 1, 100e), the IoT device (FIG. 1, 1000, a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 3, various elements, components, units/portions and/or modules in the wireless device 300 may be coupled with each other through wired interfaces or at least some thereof may be wirelessly coupled through the communication unit 310. For example, in the wireless device 300, the control unit 320 and the communication unit 310 may be coupled by wire, and the control unit 320 and the first unit (e.g., 130 or 140) may be wirelessly coupled through the communication unit 310. In addition, each element, component, unit/portion and/or module of the wireless device 300 may further include one or more elements. For example, the control unit 320 may be composed of a set of one or more processors. For example, the control unit 320 may be composed of a set of a communication control processor, an application processor, an electronic control unit (ECU), a graphic processing processor, a memory control processor, etc. In another example, the memory unit 330 may be composed of a random access memory (RAM), a dynamic RAM (DRAM), a read only memory (ROM), a flash memory, a volatile memory, a non-volatile memory and/or a combination thereof Hand-Held Device Applicable to the Present Disclosure FIG. 4 illustrates an example of a hand-held device applicable to the present disclosure.

Figure 4:
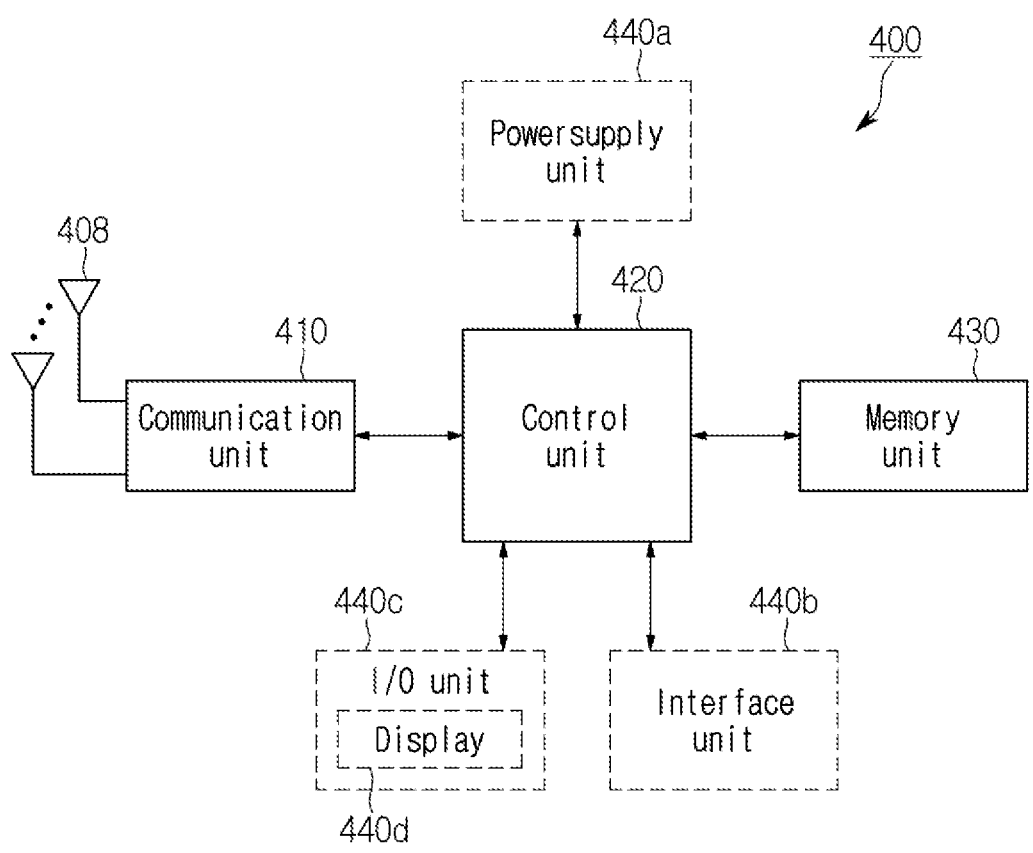
FIG. 4 illustrates an example of a hand-held device applicable to the present disclosure.

FIG. 4 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 4, the hand-held device 400 may include an antenna unit (antenna) 408, a communication unit (transceiver) 410, a control unit (controller) 420, a memory unit (memory) 430, a power supply unit (power supply)

440a, an interface unit (interface) 440b, and an input/output unit 440c. An antenna unit (antenna) 408 may be part of the communication unit 410. The blocks 410 to 430/440a to 440c may correspond to the blocks 310 to 330/340 of FIG. 3, respectively.

The communication unit 410 may transmit and receive signals (e.g., data, control signals, etc.) to and from other wireless devices or base stations. The control unit 420 may control the components of the hand-held device 400 to perform various operations. The control unit 420 may include an application processor (AP). The memory unit 430 may store data/parameters/program/code/instructions necessary to drive the hand-held device 400. In addition, the memory unit 430 may store input/output data/information, etc. The power supply unit 440a may supply power to the hand-held device 400 and include a wired/wireless charging circuit, a battery, etc. The interface unit 440b may support connection between the hand-held device 400 and another external device. The interface unit 440b may include various ports (e.g., an audio input/output port and a video input/output port) for connection with the external device. The input/output unit 440c may receive or output video information/signals, audio information/signals, data and/or user input information. The input/output unit 440c may include a camera, a microphone, a user input unit, a display 440d, a speaker and/or a haptic module.

For example, in case of data communication, the input/output unit 440c may acquire user input information/signal (e.g., touch, text, voice, image or video) from the user and store the user input information/signal in the memory unit 430. The communication unit 410 may convert the information/signal stored in the memory into a radio signal and transmit the converted radio signal to another wireless device directly or transmit the converted radio signal to a base station. In addition, the communication unit 410 may receive a radio signal from another wireless device or the base station and then restore the received radio signal into original information/signal. The restored information/signal may be stored in the memory unit 430 and then output through the input/output unit 440c in various forms (e.g., text, voice, image, video and haptic).

Type of Wireless Device Applicable to the Present Disclosure

Figure 5:
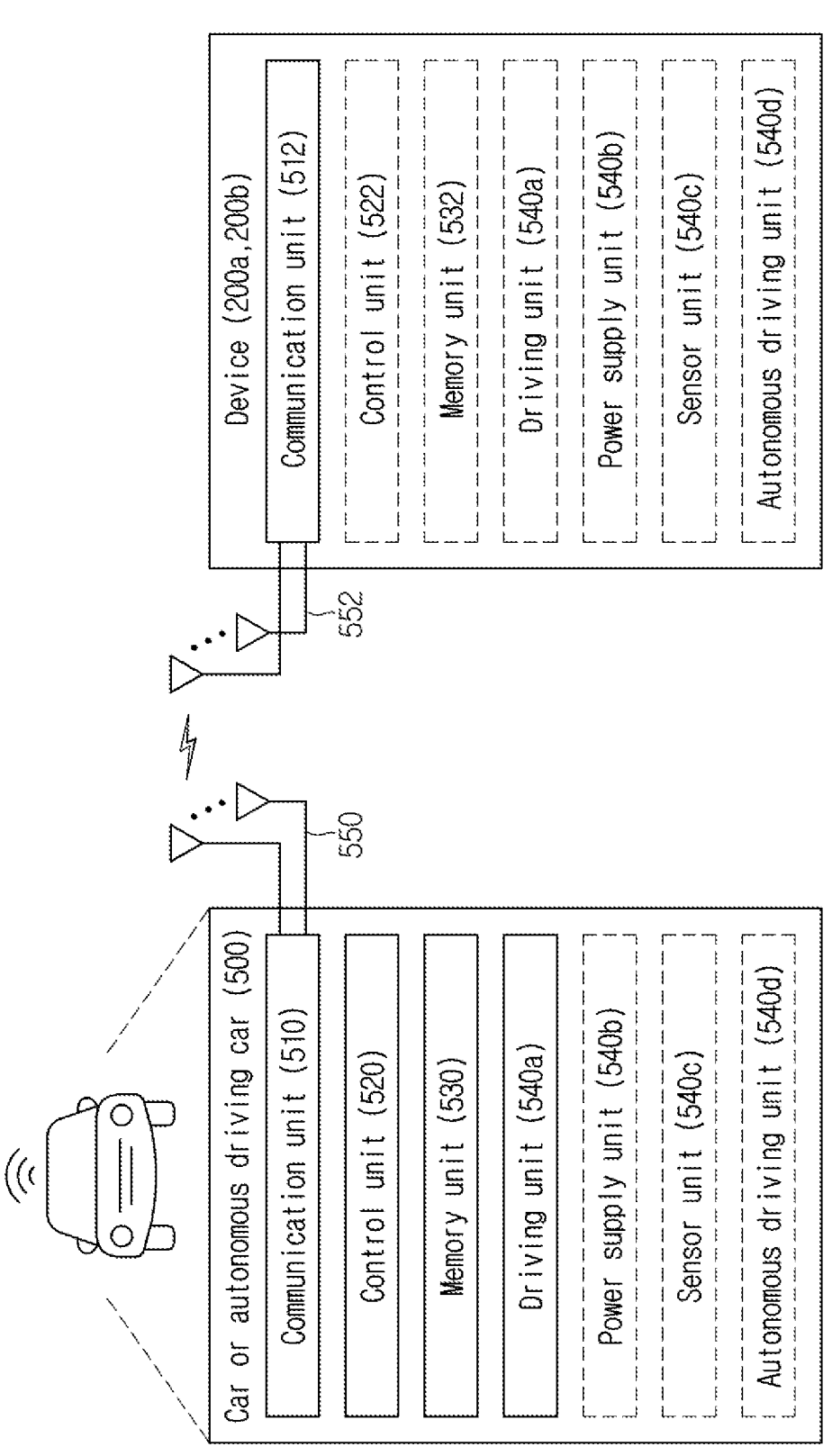
FIG. 5 illustrates an example of a car or an autonomous driving car applicable to the present disclosure.

FIG. 5 illustrates an example of a car or an autonomous driving car applicable to the present disclosure.

FIG. 5 shows a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited.

Referring to FIG. 5, the car or autonomous driving car 500 may include an antenna unit (antenna) 508, a communication unit (transceiver) 510, a control unit (controller) 520, a driving unit 540a, a power supply unit (power supply) 540b, a sensor unit 540c, and an autonomous driving unit 540d. The antenna unit 550 may be configured as part of the communication unit 510. The blocks 510/530/540a to 540d correspond to the blocks 410/430/440 of FIG. 4.

The communication unit 510 may transmit and receive signals (e.g., data, control signals, etc.) to and from external devices such as another vehicle, a base station (e.g., a base station, a road side unit, etc.), and a server. The control unit 520 may control the elements of the car or autonomous driving car 500 to perform various operations. The control unit 520 may include an electronic control unit (ECU).

Figure 6:
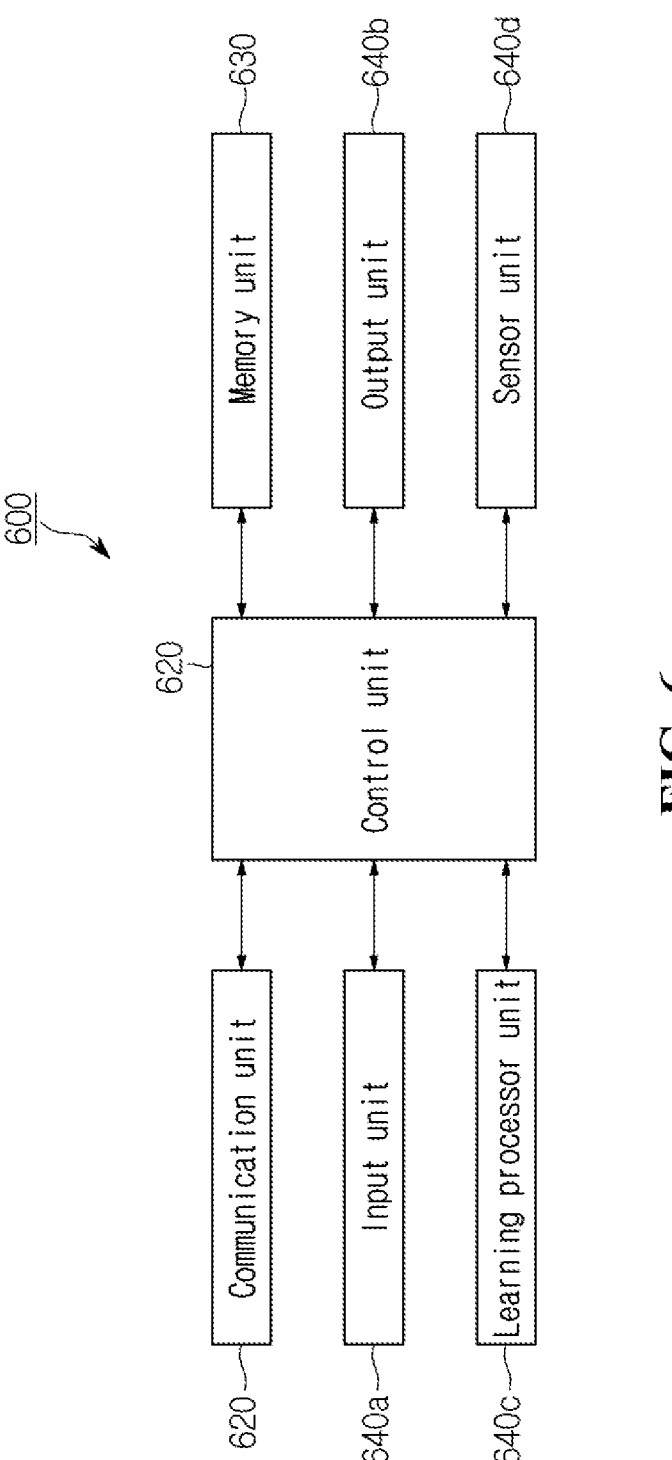
FIG. 6 illustrates an example of artificial intelligence (AI) device applicable to the present disclosure.

FIG. 6 illustrates an example of artificial intelligence (AI) device applicable to the present disclosure. For example, the AI device may be implemented as fixed or movable devices such as a TV, a projector, a smartphone, a PC, a laptop, a digital broadcast terminal, a tablet PC, a wearable device, a set-top box (STB), a radio, a washing machine, a refrigerator, a digital signage, a robot, a vehicle, or the like.

Referring to FIG. 6, the AI device 600 may include a communication unit (transceiver) 610, a control unit (controller) 620, a memory unit (memory) 630, an input/output unit 640*a*/640*b*, a leaning processor unit (learning processor) 640*c* and a sensor unit 640*d*. The blocks 610 to 630/640*a* to 640*d* may correspond to the blocks 310 to 330/340 of FIG. 3, respectively.

The communication unit 610 may transmit and receive wired/wireless signals (e.g., sensor information, user input, learning models, control signals, etc.) to and from external devices such as another AI device (e.g., FIG. 1, 100*x*, 120 or 140) or the AI server (FIG. 1, 140) using wired/wireless communication technology. To this end, the communication unit 610 may transmit information in the memory unit 630 to an external device or transfer a signal received from the external device to the memory unit 630.

The control unit 620 may determine at least one executable operation of the AI device 600 based on information determined or generated using a data analysis algorithm or a machine learning algorithm. In addition, the control unit 620 may control the components of the AI device 600 to perform the determined operation. For example, the control unit 620 may request, search for, receive or utilize the data of the learning processor unit 640*c* or the memory unit 630, and control the components of the AI device 600 to perform predicted operation or operation, which is determined to be desirable, of at least one executable operation. In addition, the control unit 620 may collect history information including operation of the AI device 600 or user's feedback on the operation and store the history information in the memory unit 630 or the learning processor unit 640*c* or transmit the history information to the AI server (FIG. 1, 140). The collected history information may be used to update a learning model.

The memory unit 630 may store data supporting various functions of the AI device 600. For example, the memory unit 630 may store data obtained from the input unit 640*a*, data obtained from the communication unit 610, output data of the learning processor unit 640*c*, and data obtained from the sensing unit 640. In addition, the memory unit 630 may store control information and/or software code necessary to operate/execute the control unit 620.

The input unit 640*a* may acquire various types of data from the outside of the AI device 600. For example, the input unit 640*a* may acquire learning data for model learning, input data, to which the learning model will be applied, etc. The input unit 640*a* may include a camera, a microphone and/or a user input unit. The output unit 640*b* may generate video, audio or tactile output. The output unit 640*b* may include a display, a speaker and/or a haptic module. The sensing unit 640 may obtain at least one of internal information of the AI device 600, the surrounding environment information of the AI device 600 and user information using various sensors. The sensing unit 640 may include a proximity sensor, an illumination sensor, an acceleration sensor, a magnetic sensor, a gyro sensor, an inertia sensor, a red green blue (RGB) sensor, an infrared (IR) sensor, a finger scan sensor, an ultrasonic sensor, an optical sensor, a microphone and/or a radar.

The learning processor unit 640*c* may train a model composed of an artificial neural network using training data. The learning processor unit 640*c* may perform AI processing along with the learning processor unit of the AI server (FIG. 1, 140). The learning processor unit 640*c* may process information received from an external device through the communication unit 610 and/or information stored in the memory unit 630. In addition, the output value of the learning processor unit 640*c* may be transmitted to the external device through the communication unit 610 and/or stored in the memory unit 630.

Figure 7:
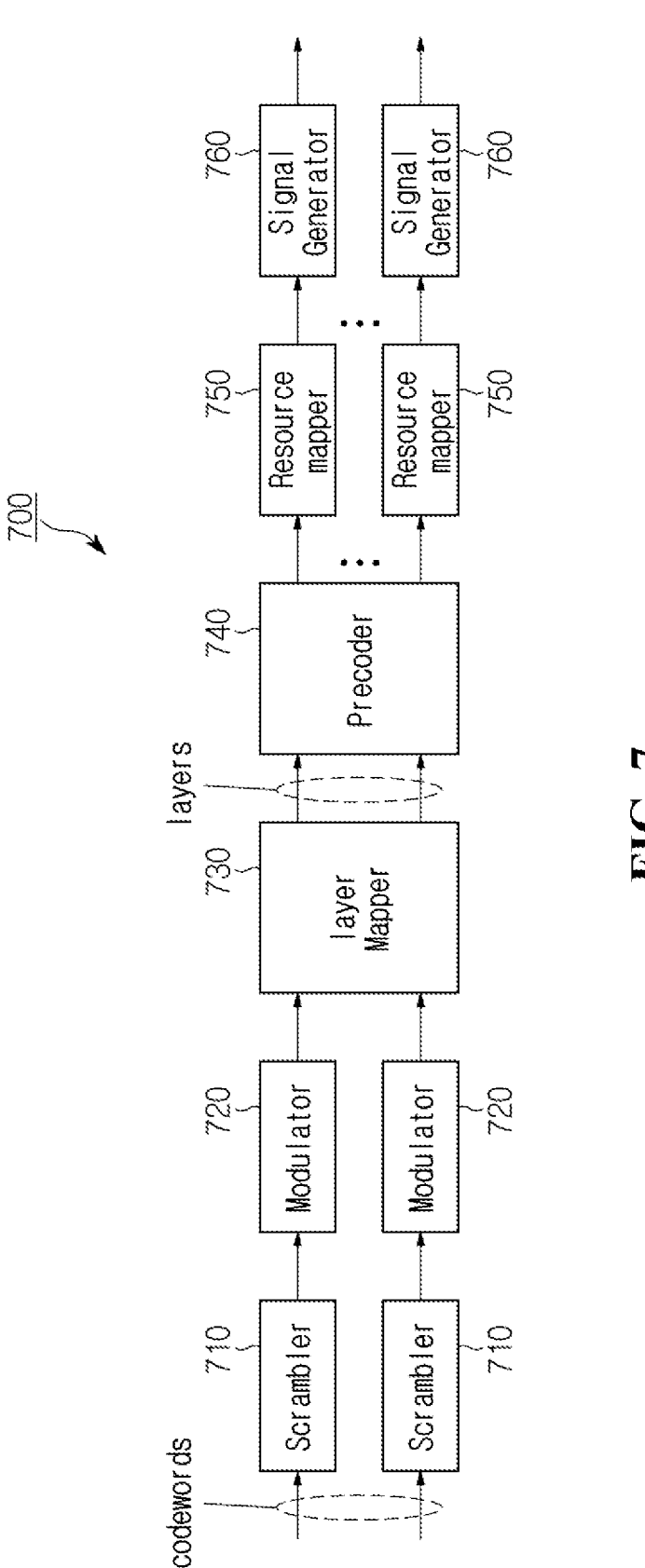
FIG. 7 illustrates physical channels applicable to the present disclosure and a signal transmission method using the same.

FIG. 7 illustrates a method of processing a transmitted signal applicable to the present disclosure. For example, the transmitted signal may be processed by a signal processing circuit. At this time, a signal processing circuit 700 may include a scrambler 710, a modulator 720, a layer mapper 730, a precoder 740, a resource mapper 750, and a signal generator 760. At this time, for example, the operation/function of FIG. 7 may be performed by the processors 202*a* and 202*b* and/or the transceiver 206*a* and 206*b* of FIG. 2. In addition, for example, the hardware element of FIG. 7 may be implemented in the processors 202*a* and 202*b* of FIG. 2 and/or the transceivers 206*a* and 206*b* of FIG. 2. For example, blocks 1010 to 1060 may be implemented in the processors 202*a* and 202*b* of FIG. 2. In addition, blocks 710 to 750 may be implemented in the processors 202*a* and 202*b* of FIG. 2 and a block 760 may be implemented in the transceivers 206*a* and 206*b* of FIG. 2, without being limited to the above-described embodiments.

A codeword may be converted into a radio signal through the signal processing circuit 700 of FIG. 7. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 10. Specifically, the codeword may be converted into a bit sequence scrambled by the scrambler 710. The scramble sequence used for scramble is generated based in an initial value and the initial value may include ID information of a wireless device, etc. The scrambled bit sequence may be modulated into a modulated symbol sequence by the modulator 720. The modulation method may include pi/2-binary phase shift keying (pi/2-BPSK), m-phase shift keying (m-PSK), m-quadrature amplitude modulation (m-QAM), etc.

A complex modulation symbol sequence may be mapped to one or more transport layer by the layer mapper 730. Modulation symbols of each transport layer may be mapped to corresponding antenna port(s) by the precoder 740 (precoding). The output z of the precoder 740 may be obtained by multiplying the output y of the layer mapper 730 by an N*M precoding matrix W. Here, N may be the number of antenna ports and M may be the number of transport layers. Here, the precoder 740 may perform precoding after transform precoding (e.g., discrete Fourier transform (DFT)) for complex modulation symbols. In addition, the precoder 740 may perform precoding without performing transform precoding.

The resource mapper 750 may map modulation symbols of each antenna port to time-frequency resources. The time-frequency resources may include a plurality of symbols (e.g., a CP-OFDMA symbol and a DFT-s-OFDMA symbol) in the time domain and include a plurality of subcarriers in the frequency domain. The signal generator 760 may generate a radio signal from the mapped modulation symbols, and the generated radio signal may be transmitted to another device through each antenna. To this end, the signal generator 760 may include an inverse fast Fourier transform (IFFT) module, a cyclic prefix (CP) insertor, a digital-to-analog converter (DAC), a frequency uplink converter, etc.

A signal processing procedure for a received signal in the wireless device may be configured as the inverse of the signal processing procedures 710 to 760 of FIG. 7. For example, the wireless device (e.g., 200a or 200b of FIG. 2) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to a codeword through a resource de-mapper process, a postcoding process, a demodulation process and a de-scrambling process. The codeword may be restored to an original information block through decoding. Accordingly, a signal processing circuit (not shown) for a received signal may include a signal restorer, a resource de-mapper, a postcoder, a demodulator, a de-scrambler and a decoder.

6G Communication System

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 1 below. That is, Table 1 shows the requirements of the 6G system.

TABLE 1

| Per device peak data rate | 1 Tbps |
| E2E latency | 1 ms |
| Maximum spectral efficiency | 100 bps/Hz |
| Mobility support | up to 1000 km/hr |
| Satellite integration | Fully |
| AI | Fully |
| Autonomous vehicle | Fully |
| XR | Fully |
| Haptic Communication | Fully |

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

Figure 8:
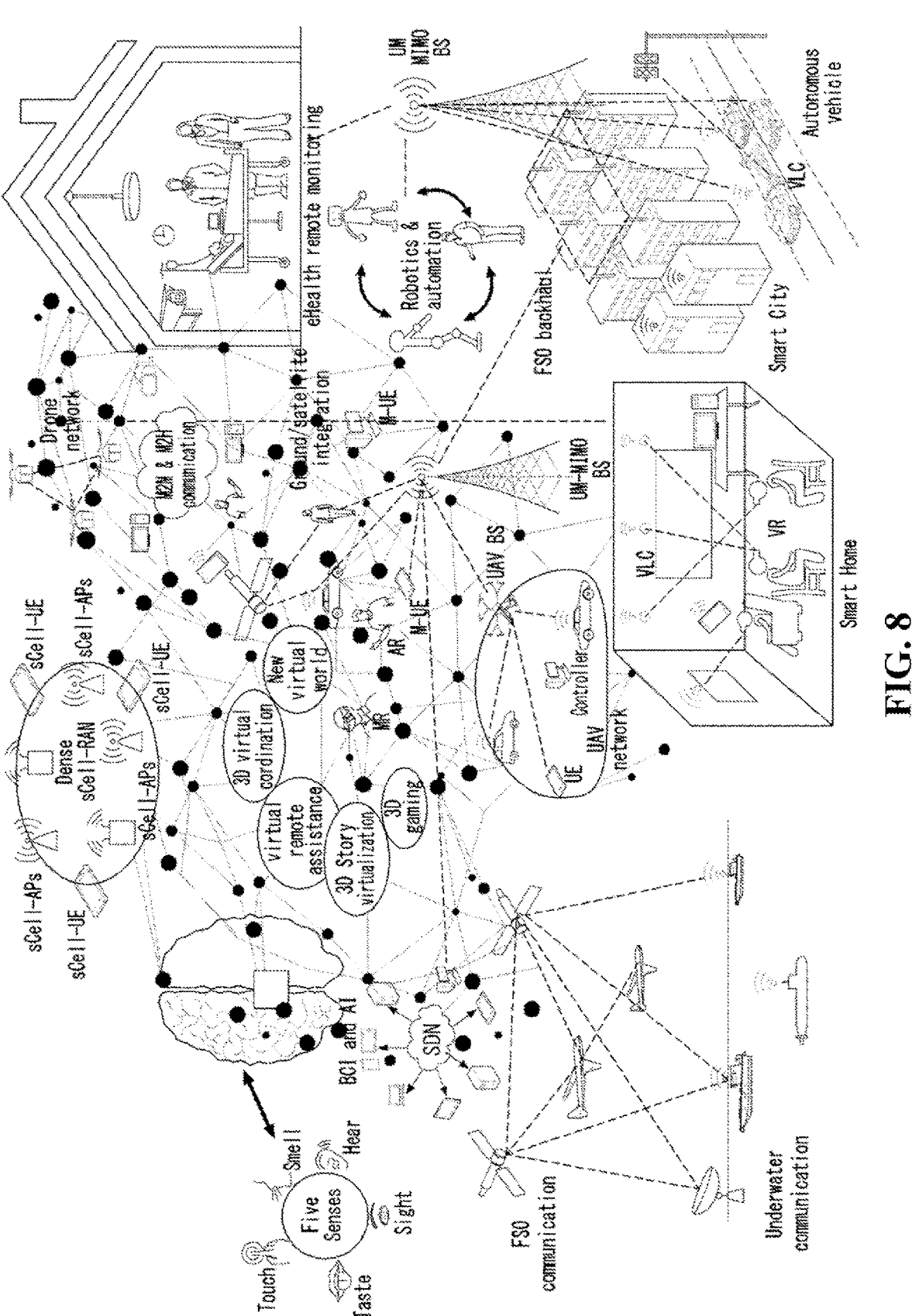
FIG. 8 illustrates an example of a communication structure providable in a 6th generation (6G) system applicable to the present disclosure.

FIG. 8 illustrates an example of a communication structure providable in a 6G system applicable to the present disclosure.

Referring to FIG. 8, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimension connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduces costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability.

Optical Wireless Technology

Optical wireless communication (OWC) technology is planned for 6G communication in addition to RF based communication for all possible device-to-access networks. This network is connected to a network-to-backhaul/fronthaul network connection. OWC technology has already been used since 4G communication systems but will be more widely used to satisfy the requirements of the 6G communication system. OWC technologies such as light fidelity/visible light communication, optical camera communication and free space optical (FSO) communication based on wide band are well-known technologies. Communication based on optical wireless technology may provide a very high data rate, low latency and safe communication. Light detection and ranging (LiDAR) may also be used for ultra high resolution 3D mapping in 6G communication based on wide band.

FSO Backhaul Network

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Quantum Communication

In the context of the 6G network, unsupervised reinforcement learning of the network is promising. The supervised learning method cannot label the vast amount of data generated in 6G. Labeling is not required for unsupervised learning. Thus, this technique can be used to autonomously build a representation of a complex network. Combining reinforcement learning with unsupervised learning may enable the network to operate in a truly autonomous way.

Figure 9:
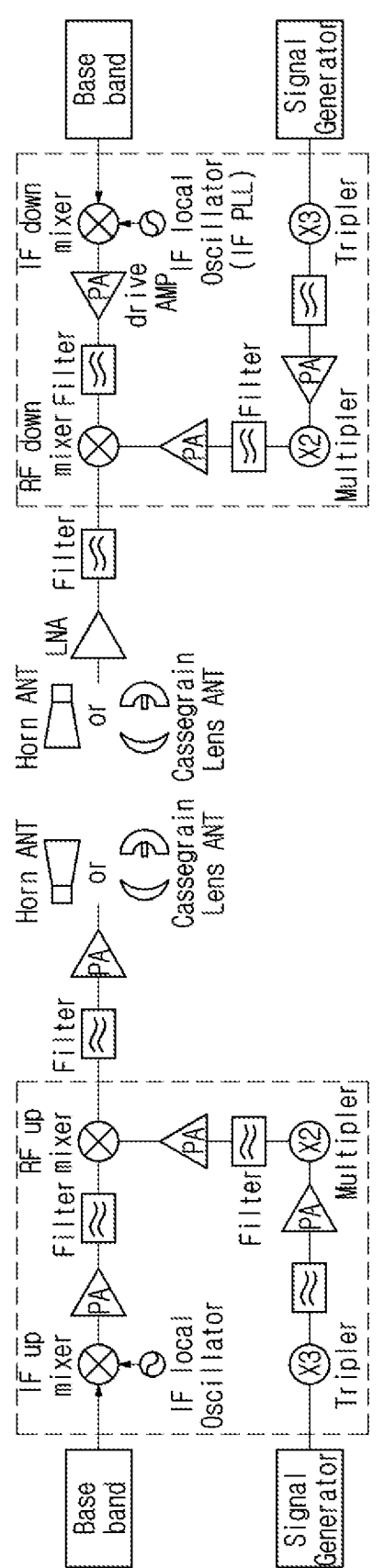
FIG. 9 illustrates a THz wireless communication transceiver applicable to the present disclosure.

FIG. 9 illustrates a THz wireless communication transceiver applicable to the present disclosure.

Referring to FIG. 9, THz wireless communication may be classified based on the method of generating and receiving THz. The THz generation method may be classified as an optical component or electronic component based technology.

At this time, the method of generating THz using an electronic component includes a method using a semiconductor component such as a resonance tunneling diode (RTD), a method using a local oscillator and a multiplier, a monolithic microwave integrated circuit (MMIC) method using a compound semiconductor high electron mobility transistor (HEMT) based integrated circuit, and a method using a Si-CMOS-based integrated circuit. In the case of FIG. 9, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 9. In FIG. 9, IF represents an intermediate frequency, a tripler and a multiplier represents a multiplier, PA represents a power amplifier, and LNA represents a low noise amplifier, and PLL represents a phase-locked loop.

Figure 19:
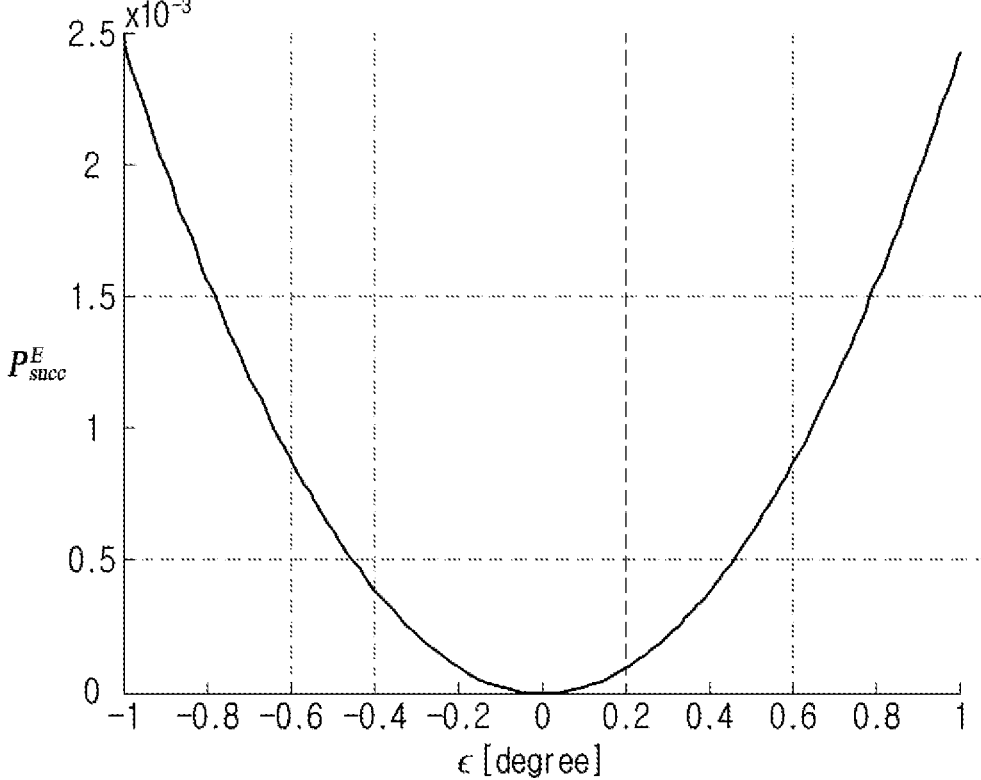
FIG. 19 illustrates an Eve's success probability according to a rotation angle error in a Faraday rotator mirror applicable to the present disclosure.
Figure 20:
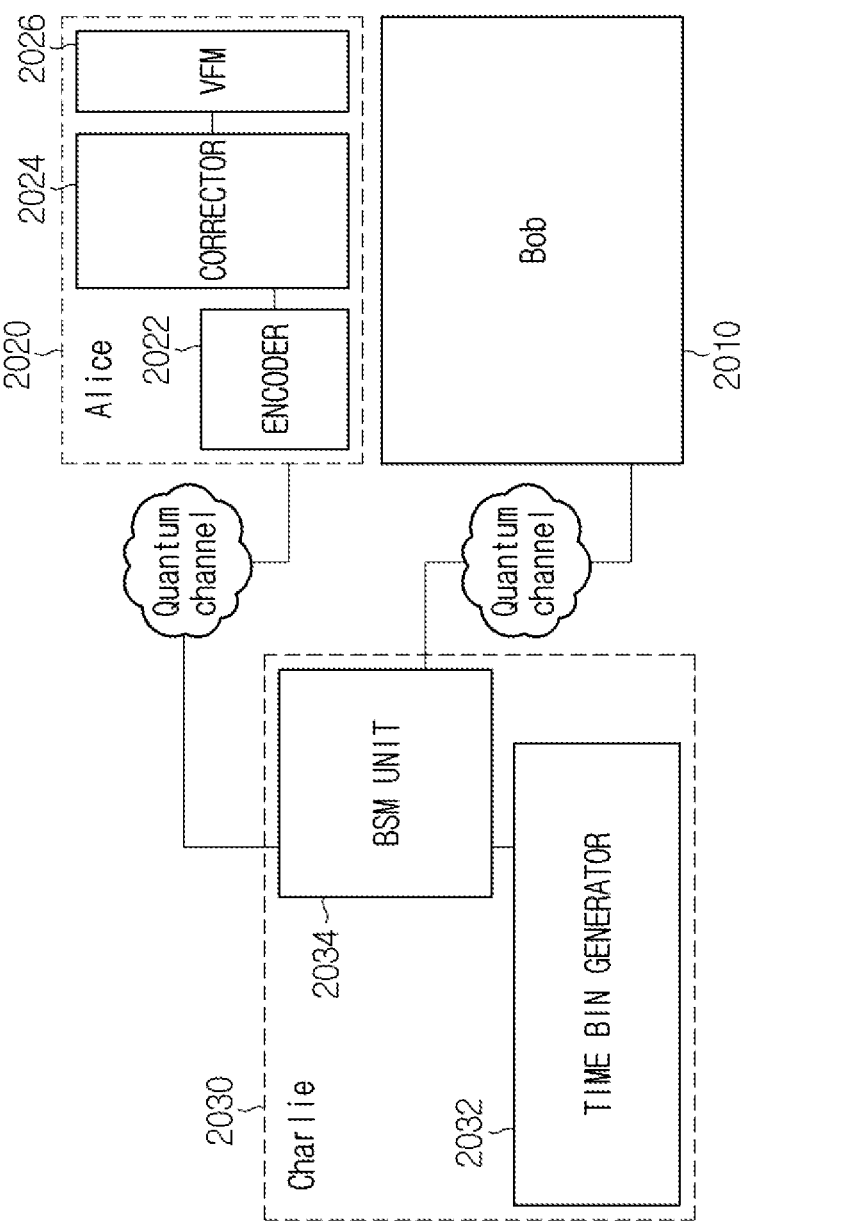
FIG. 20 illustrates a communication system supporting quantum key distribution according to an embodiment of the present disclosure.

FIG. 19 illustrates a THz signal generation method applicable to the present disclosure. FIG. 20 illustrates a wireless communication transceiver applicable to the present disclosure.

Figure 10:
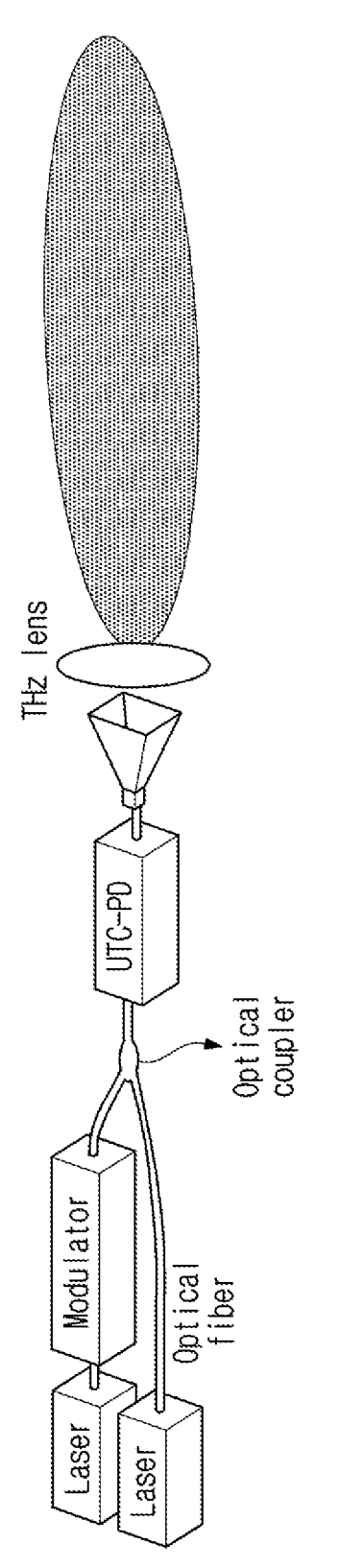
FIG. 10 illustrates a THz signal generation method applicable to the present disclosure.
Figures 11, 12:
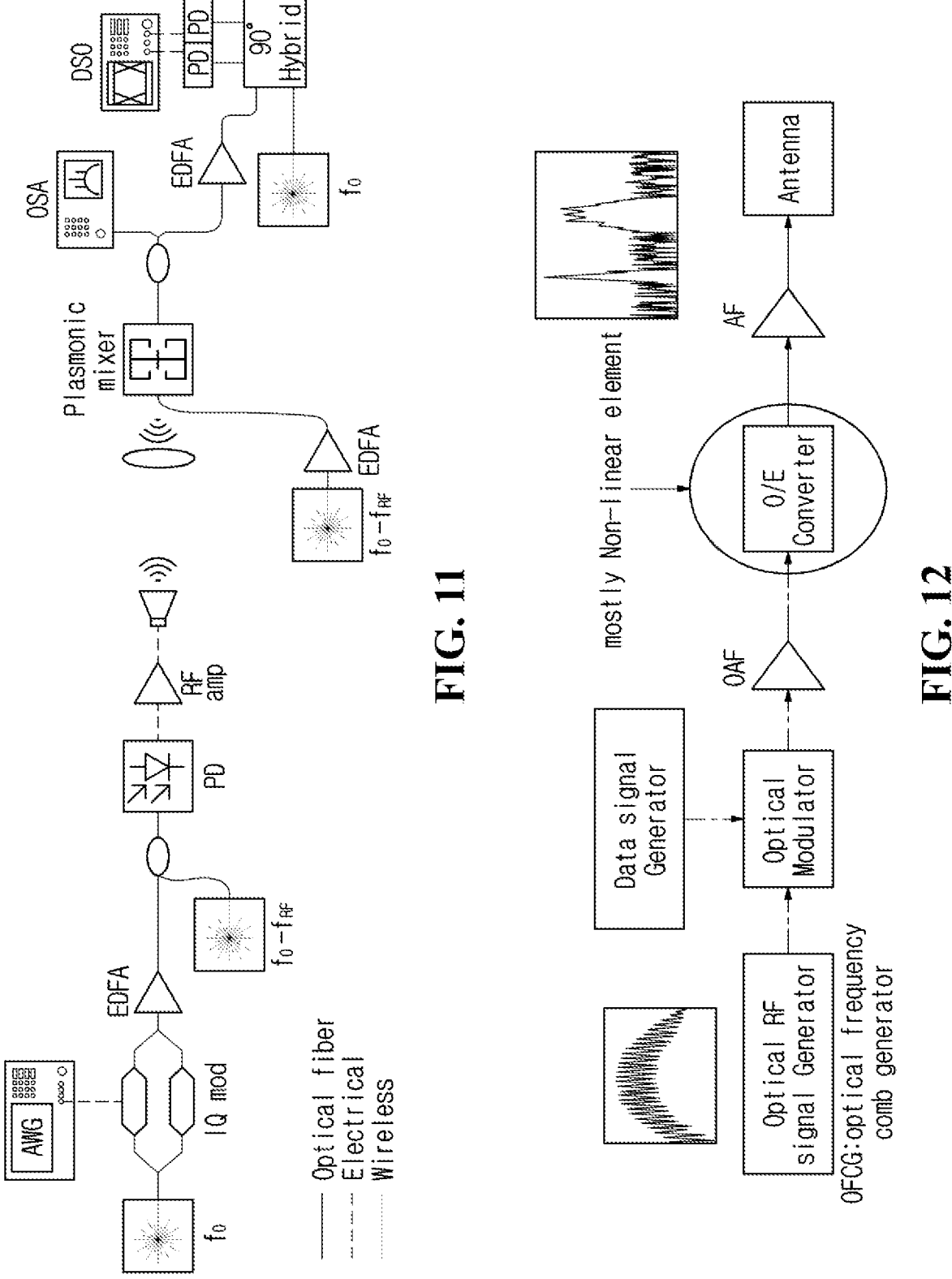
FIG. 11 illustrates a wireless communication transceiver applicable to the present disclosure.
FIG. 12 illustrates a THz signal generation method applicable to the present disclosure.

Referring to FIGS. 10 and 11, the optical component-based THz wireless communication technology means a method of generating and modulating a THz signal using an optical component. The optical component-based THz signal generation technology refers to a technology that generates an ultrahigh-speed optical signal using a laser and an optical modulator, and converts it into a THz signal using an ultrahigh-speed photodetector. This technology is easy to increase the frequency compared to the technology using only the electronic component, can generate a high-power signal, and can obtain a flat response characteristic in a wide frequency band. In order to generate the THz signal based on the optical component, as shown in FIG. 10, a laser diode, a broadband optical modulator, and an ultrahigh-speed photodetector are required. In the case of FIG. 10, the light signals of two lasers having different wavelengths are combined to generate a THz signal corresponding to a wavelength difference between the lasers. In FIG. 10, an optical coupler refers to a semiconductor component that transmits an electrical signal using light waves to provide coupling with electrical isolation between circuits or systems, and a uni-travelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 11, an erbium-doped fiber amplifier (EDFA) represents an optical fiber amplifier to which erbium is added, a photo detector (PD) represents a semiconductor component capable of converting an optical signal into an electrical signal, and OSA represents an optical sub assembly in which various optical communication functions (e.g., photoelectric conversion, electrophotic conversion, etc.) are modularized as one component, and DSO represents a digital storage oscilloscope.

Figure 13:
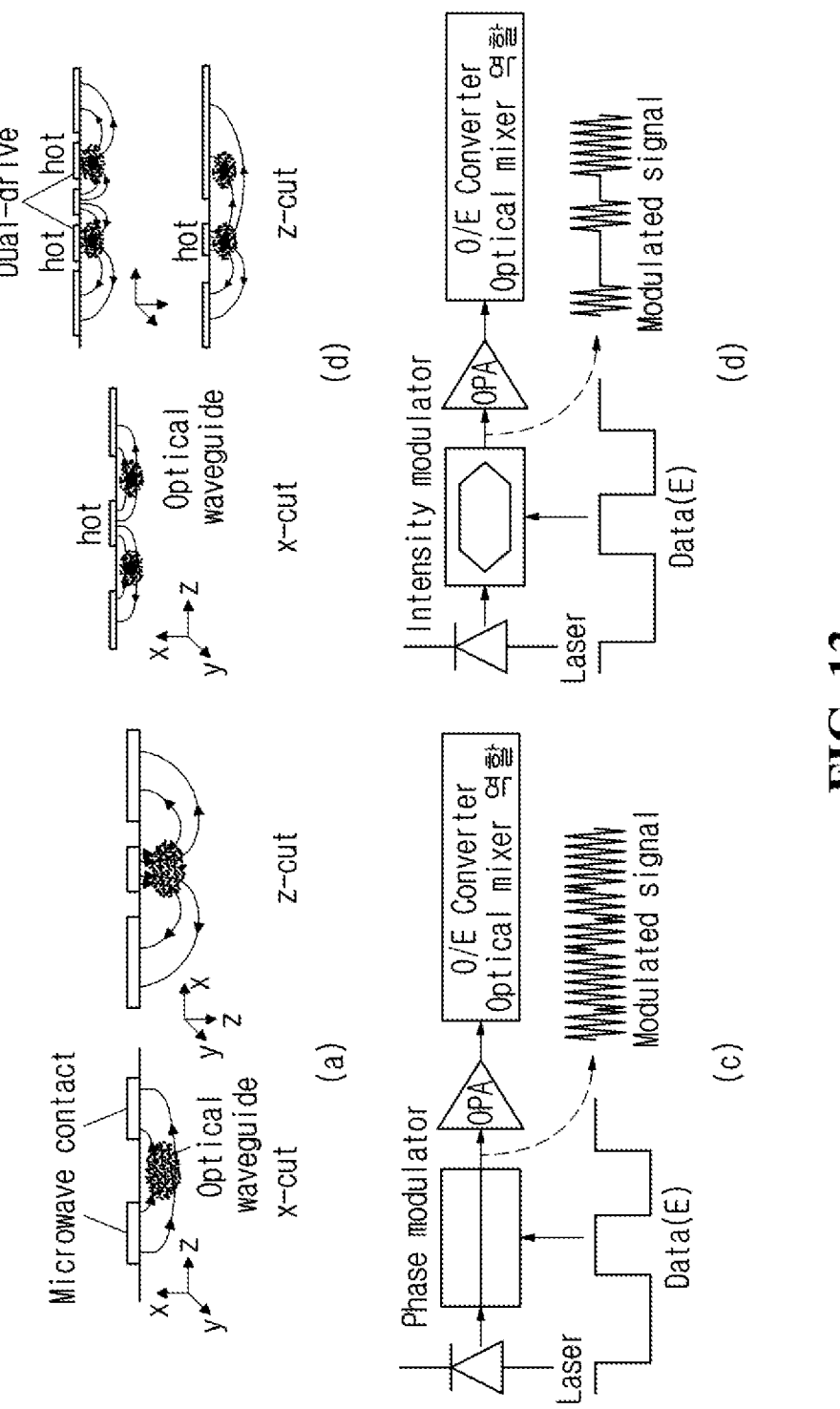
FIG. 13 illustrates a wireless communication transceiver applicable to the present disclosure.

FIG. 12 illustrates a transmitter structure applicable to the present disclosure. FIG. 13 illustrates a modulator structure applicable to the present disclosure.

Referring to FIGS. 12 and 13, generally, the optical source of the laser may change the phase of a signal by passing through the optical wave guide. At this time, data is carried by changing electrical characteristics through microwave contact or the like. Thus, the optical modulator output is formed in the form of a modulated waveform. A photoelectric modulator (O/E converter) may generate THz pulses according to optical rectification operation by a nonlinear crystal, photoelectric conversion (O/E conversion) by a photoconductive antenna, and emission from a bunch of relativistic electrons. The terahertz pulse (THz pulse) generated in the above manner may have a length of a unit from femto second to pico second. The photoelectric converter (O/E converter) performs down conversion using non-linearity of the component.

Given THz spectrum usage, multiple contiguous GHz bands are likely to be used as fixed or mobile service usage for the terahertz system. According to the outdoor scenario criteria, available bandwidth may be classified based on oxygen attenuation 10-2 dB/km in the spectrum of up to 1 THz. Accordingly, a framework in which the available bandwidth is composed of several band chunks may be considered. As an example of the framework, if the length of the terahertz pulse (THz pulse) for one carrier (carrier) is set to 50 ps, the bandwidth (BW) is about 20 GHz.

Effective down conversion from the infrared band to the terahertz band depends on how to utilize the nonlinearity of the O/E converter. That is, for down-conversion into a desired terahertz band (THz band), design of the photoelectric converter (O/E converter) having the most ideal non-linearity to move to the corresponding terahertz band (THz band) is required. If a photoelectric converter (O/E converter) which is not suitable for a target frequency band is used, there is a high possibility that an error occurs with respect to the amplitude and phase of the corresponding pulse.

In a single carrier system, a terahertz transmission/reception system may be implemented using one photoelectric converter. In a multi-carrier system, as many photoelectric converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system can be considered. The down-frequency-converted signal based on the photoelectric converter may be transmitted in a specific resource region (e.g., a specific frame). The frequency domain of the specific resource region may include a plurality of chunks. Each chunk may be composed of at least one component carrier (CC).

Quantum Cryptography Communication

In a quantum cryptography communication system, a signal is carried using a single photon, which is a minimum unit of light, unlike conventional communication methods that communicate by wavelength or amplitude. While stability of conventional cryptography systems is mostly guaranteed by complexity of mathematical algorithms, stability of quantum cryptography communication is based on the unique properties of a quantum and thus stability is guaranteed unless the physical laws of quantum mechanics are broken.

The most representative quantum key distribution protocol is the BB84 protocol proposed by C. H. Bennett and G. Brassard in 1984. In the BB84 protocol, information is carried in states such as polarization and phase of photons, and sift keys are shared absolutely safely in theory using the properties of the quantum. [Table 2] below shows an example of the BB84 protocol that generates the sift key by carrying information in a polarization state between Alice at a transmission side and Bob at a reception side. The overall flow of the BB84 protocol is as follows.

(1) Alice randomly generates bits.

(2) Alice randomly selects a transmission polarizer to determine in which polarization bit information is carried.

(3) Alice generates a polarization signal corresponding to the bits randomly generated in (1) and the polarizer randomly selected in (2) and transmits it through a quantum channel.

(4) Bob randomly selects a measurement polarizer to measure the polarization signal transmitted by Alice.

(5) Bob measures and stores the polarization signal transmitted by Alice with the selected polarizer.

(6) Alice and Bob share which polarizer is used through the classical channel.

(7) Alice and Bob obtain a sift key by storing only bits with the same polarizer and removing bits with different polarizers.

TABLE 2

| Bits generated by Alice | 0 | 1 | 1 | 0 | 1 | 0 | 0 | 1 |
|---|---|---|---|---|---|---|---|---|
| Transmission polarizer selected by Alice | + | + | × | + | × | × | × | + |
| Polarization signal transmitted by Alice | ↑ | → | ↘ | ↑ | ↘ | ↗ | ↗ | → |
| Measurement signal measured by Bob | + | × | × | × | + | × | + | × |
| Polarization signal measured by Bob | ↑ | ↗ | ↘ | ↗ | → | ↗ | → | → |
| Verification of whether transmission polarizer and measurement polarizer match | Data exchange through classical channel | | | | | | | |
| Finally generated sift key | 0 | | 1 | | 0 | | | 1 |

Figure 14:
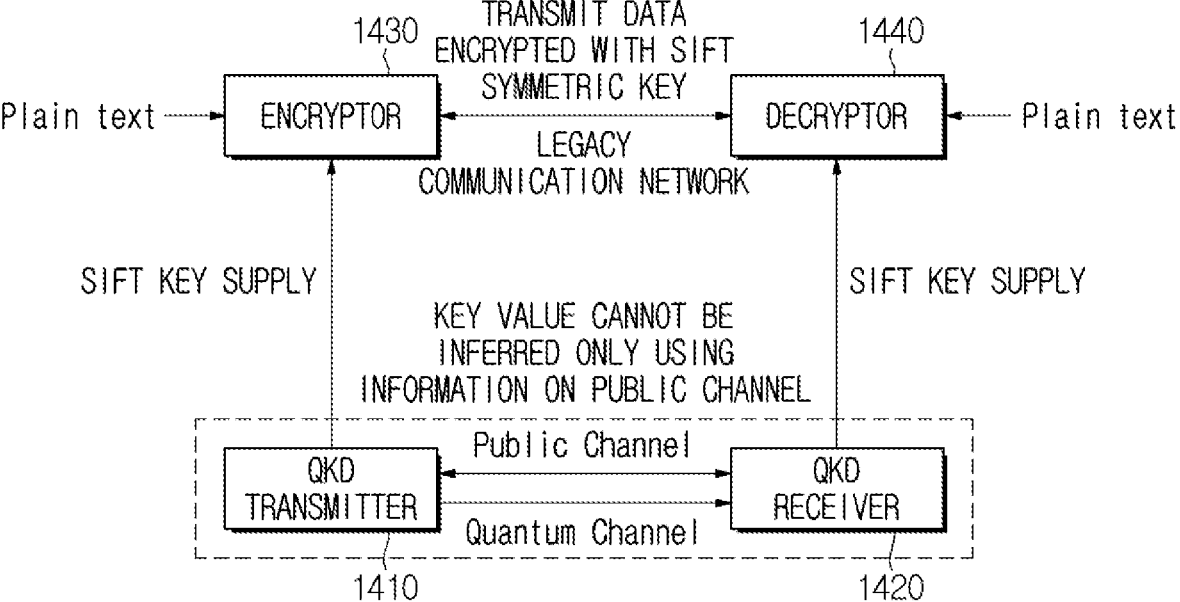
FIG. 14 illustrates a structure of a quantum cryptography communication system applicable to the present disclosure.

FIG. 14 illustrates a structure of a quantum cryptography communication system applicable to the present disclosure. Referring to FIG. 14, a quantum key distribution (QKD)

transmitter 1410 may perform communication by being connected to a QKD receiver 1420 through a public channel and a quantum channel. At this time, the QKD transmitter 1410 may supply a sift key to an encryptor 1430, and the QKD receiver 1420 may also supply the sift key to a decryptor 1440. Here, plain text may be input/output to the encryptor 1430, and the encryptor 1430 may transmit data encrypted with a sift symmetric key (through a legacy communication network) to the decryptor 1440. In addition, plain text may be input/output to the decryptor 1440.

Although this BB84 protocol guarantees absolute security in theory, defects may occur in actual hardware implementation. For example, polarization distortion may occur due to birefringence of an optical fiber. Here, birefringence refers to a phenomenon in which a polarization component perpendicular to an optical axis of a medium and a polarization component horizontal to the optical axis of the medium experience different time delays when light passes through a non-isotropic medium. Different time delay due to birefringence cause a phase difference between the two components, and a phase difference between the two components causes a polarization deviation. In order to solve this polarization deviation, a plug and play (PnP) quantum key distribution method has been proposed.

Figure 15:
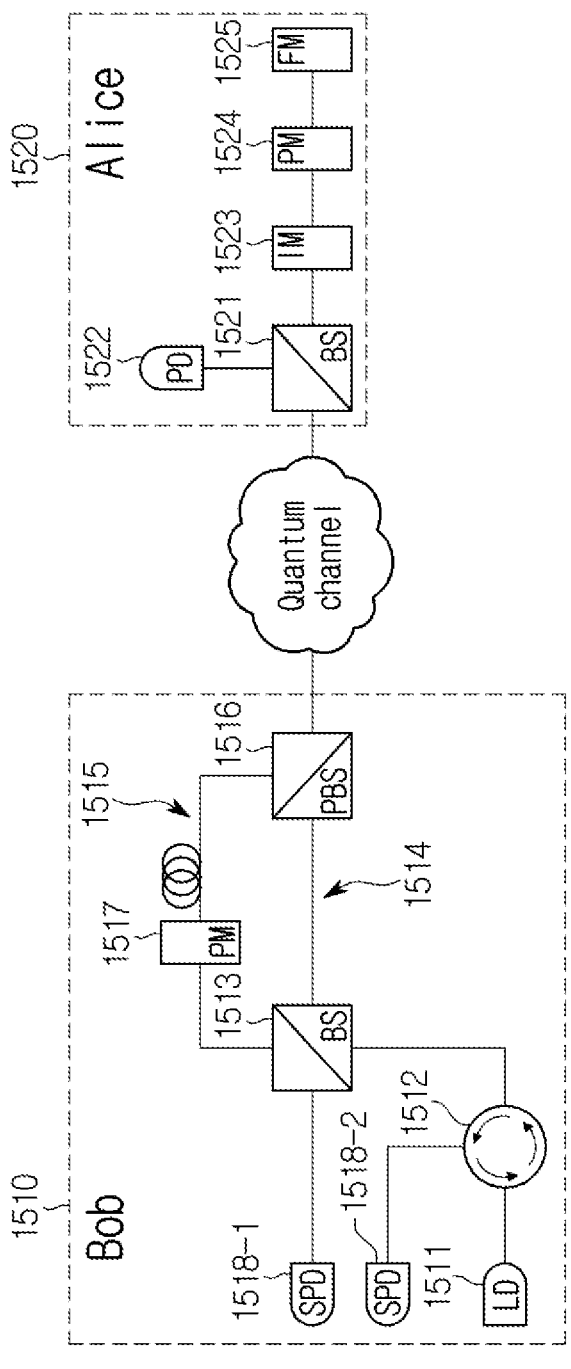
FIG. 15 illustrates a structure of a plug and play (PnP) quantum key distribution system applicable to the present disclosure.

The PnP quantum key distribution method has an advantage of automatically compensating for polarization deviation due to birefringence during transmission. A general quantum key distribution system follows a one-way method in which Alice, the transmission side, transmits information carried in a quantum state, and Bob, the reception side, measures the quantum state and generates a sift key. On the other hand, the PnP quantum key distribution method follows a two-way method in which, when Bob generates and transmits a reference pulse, Alice receives the reference pulse, carries bit information in a phase state, and returns the pulse with bit information to Bob. FIG. 15 illustrates a structure of a plug and play (PnP) quantum key distribution system applicable to the present disclosure. The overall flow of the BB84 protocol implemented through the PnP quantum key distribution system will be described with reference to FIG. 15 as follows.

First, Bob 1510 generates a reference pulse in the following order and transmits it to Alice. Bob 1510 generates a pulse using a laser diode (LD) 1511. The generated pulse is output to a beam splitter (BS) 1513 through a circulator 1512. Bob 1510 splits the generated pulse into two pulses a and b using the beam splitter 1513. Among the split pulses, the pulse a passes through a short path 1514, and polarized light is rotated by 90° by a polarization controller (not shown) included in the short path. The pulse b passes through a long path 1516 and is time-delayed. Since the pulse a and the pulse b have polarized lights orthogonal to each other, they are output to a quantum channel through the same port of a polarization beam splitter (PBS) 1516.

Subsequently, Alice 1520 carries the bit information in the phase of the reference pulse sent by Bob in the following order and transmits it to Bob 1510. The received pulses a and b are split by a beam splitter 1521, and some of them are input to an optical sensor (e.g., a photo diode (PD) 1522. Alice 1520 analyzes the timing and intensity of the received pulse using an optical sensor, generates a trigger signal for synchronizing the clocks of Alice 1520 and Bob 1510, and controls a variable attenuator such that the variable attenuator (VA) (e.g., an intensity modulator (IM) 1523) attenuates the pulse to a single photon level. Based on the synchronized clock, the variable attenuator attenuates the second pulse, the pulse b, to a single photon level, and a phase modulator (PM) 1524 acts on the attenuated pulse b, applying phase shift corresponding to a transmission basis and bit information selected in the BB84 protocol among 0, π/2, π and 3π/2. The pulses a and b are reflected from a Faraday rotator mirror (FM) 1525, so that polarized light is transmitted to Bob 1510 through the quantum channel in a state of being rotated by 90°.

Next, Bob 1510 receives the pulses a and b transmitted by Alice 1520 in the following order, and measures the stored bit information. Since polarized lights of the pulses a and b are rotated by 90° by the Faraday rotator mirror 1525 of Alice 1520, they pass through opposite paths in the polarization splitter of Bob 1510. For example, the pulse a passes through a long path 1515 and the pulse b passes through a short path 1514. The pulse a undergoes a phase shift of 0 or π/2 corresponding to the measurement basis selected by Bob 1510 by the phase modulator 1517 of the long path 1515, and the pulse b undergoes polarization rotation of 90° by a polarization controller (not shown) of the short path to have the same polarized light as the pulse a. The pulse a and b consequently travel paths having the same length and meet simultaneously at the beam splitter 1513 of Bob 1510 to cause interference. When measurement basis of Bob 1510 matches transmission basis of Alice 1520, the overlapping pulse is deterministically detected by one of a single photon detector (SPD) 1518-1 and a single photo detector 1518-2. If the transmission basis does not match, the pulse is stochastically detected by one of the single photon detector 1518-1 and the single photon detector 1518-2.

Figure 16:
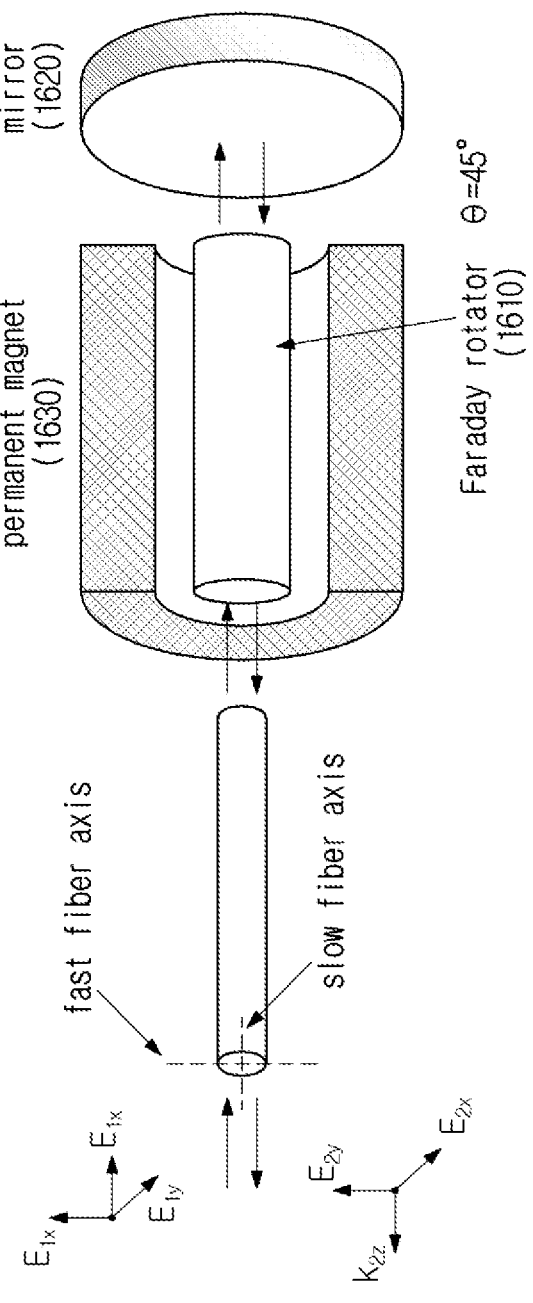
FIG. 16 illustrates a structure of a Faraday rotator mirror applicable to the present disclosure.

As described above, the effect of birefringence generated in the transmission path from Bob to Alice may be compensated for in the path from Alice to Bob. At this time, a Faraday rotator mirror plays a key role. The Faraday rotator mirror may be configured as shown in FIG. 16 below. FIG. 16 illustrates a structure of a Faraday rotator mirror applicable to the present disclosure. Referring to FIG. 16, the Faraday rotator mirror includes a Faraday rotator 1610, a mirror 1620, and a permanent magnet 1630. The Faraday rotator 1610 is based on Faraday's law, which explains that when light passes through a magnetic field, it receives a force in a certain direction and rotates. The rotation angle of polarized light by the Faraday rotator 1610 may be calculated as in [Equation 1] below.

$$\beta = VBd \qquad \text{[Equation 1]}$$

In [Equation 1], β denotes a rotation angle [radian], V denotes a Verdet constant [radian/(T·m)], B denotes magnetic flux density [T], d denotes a length [m] of a path where the interaction between light and magnetic field occurred.

Figure 17A:
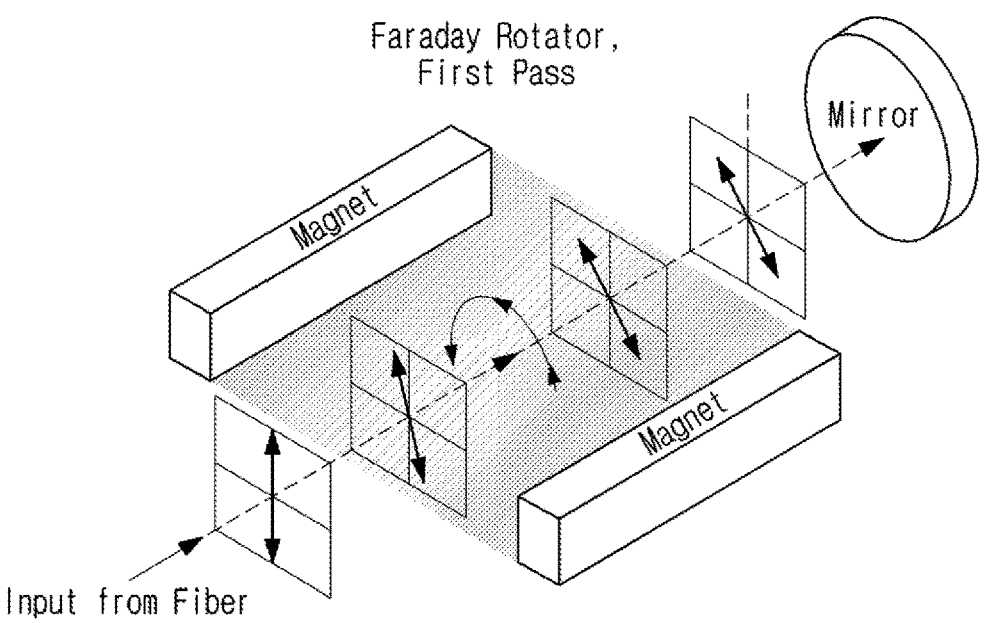
FIGS. 17A and 17B illustrate polarization rotation in a Faraday rotator mirror applicable to the present disclosure.
Figure 17B:
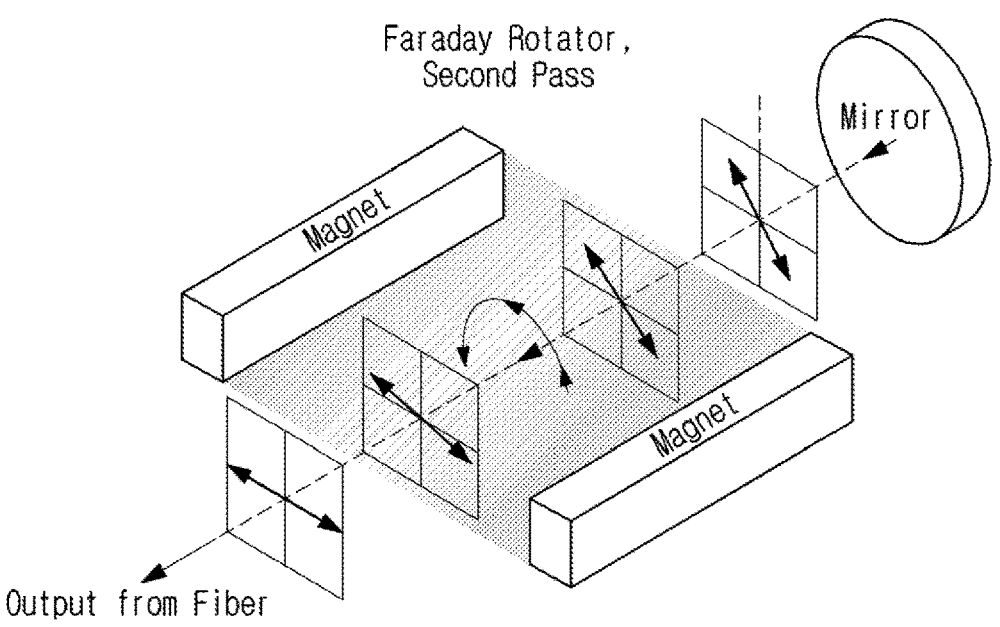

FIGS. 17A and 17B illustrate polarization rotation in a Faraday rotator mirror applicable to the present disclosure. FIG. 17A illustrates an incident situation, and FIG. 17B illustrates a reflected situation. The Faraday rotor used in the Faraday rotation mirror has a rotation angle set at 45°. In an ideal case, polarization rotation of 90° in total is achieved by 45° each when the light is incident on and reflected from the Faraday rotator mirror. Therefore, in the path from Bob to Alice, a polarization component perpendicular to an optical axis and a polarization component horizontal to the optical axis are reversed in the path from Alice to Bob. This means that the two components experience opposite time delay due to birefringence in the path from Bob to Alice and the path from Alice to Bob. As a result, since the two components experience the same time delay while traveling back and forth between Bob and Alice, Bob receives a signal in which polarization deviation due to birefringence is compensated for in the returned pulse. However, there is a polarization rotation of 90° by the Faraday rotator mirror.

Specific Embodiment of the Present Disclosure

The present disclosure is to compensate for polarization deviation due to birefringence by using a Faraday rotator mirror in a communication system supporting quantum key distribution. Specifically, the present disclosure relates to a technique for correcting polarization distortion by a Faraday rotator mirror when using the Faraday rotator mirror.

A Faraday rotator mirror is widely known as a method of compensating for polarization deviation due to birefringence. However, commercially available Faraday rotator mirrors may not accurately guarantee a rotation angle of 45° due to process errors and variation according to temperature and wavelength. According to the data sheet provided by General Photonics as shown in [Table 3] below, commercially available Faraday rotator mirrors have a process error of up to ±1° at room temperature (e.g., 23° C.), and shows variations of ±0.12°/° C. and ±0.12°/nm depending on the temperature and wavelength due to the influence of Verdet's constant varying according to the temperature and wavelength.

TABLE 3

| Operating Wavelength | 1550 nm, 1310 nm | 1064 nm |
|---|---|---|
| Operating Bandwidth | ±50 nm | ±5 nm |
| Insertion Loss | 0.3 dB typical 0.5 dB max. | 3.0 dB max. |
| Faraday Rotation Angle | 90 degrees | 90 degrees |
| Rotation Angle Tolerance (Center Wavelength at 23° C.) | ±1 degree | ±6 degrees |
| Rotation Angle Wavelength Dependence | ±0.12 degree/nm | |
| Rotation Angle Temperature Dependence | ±0.12 degree/° C. | PMD: 0.05 ps |
| Reflection Polarization Dependence | 0.5% max. | PDL: 0.05 dB |
| Optical Power Handling | 300 mW min. | 150 mW |
| Operating Temperature | 0 to 70° C. | −5 to 50° C. |
| Storage Temperature | −40 to 85° C. | −40 to 85° C. |
| Fiber Type | SMF-28 | HI 1060 Fiber |
| Dimensions | Ψ 5.5 × 32 mm (pigtailed) Ψ 9.5 × 50 mm (NoTailTM) | Ψ 5.5 × 35 mm (pigtailed) |

Imperfection of the aforementioned Faraday rotator mirror may increase the qbit error rate (QBER) by attenuating the compensation effect for birefringence. In addition, imperfection of the Faraday rotator mirror may cause security loopholes while distorting the state space of the BB84 protocol transmitted by Alice. In the case of using an ideal Faraday rotator mirror, the state space of the BB84 state transmitted by Alice is expressed as [Equation 2] below.

$$|\Phi_k\rangle = \frac{1}{\sqrt{2}}\left(e^{ik\delta}|a\rangle + |b\rangle\right), \qquad \text{[Equation 2]}$$

$$k = 0, 1, 2, 3$$

In [Equation 2], $|\Phi_k\rangle$ denotes a state space, δ denotes π/2, k denotes an index corresponding to a phase state selected by Alice among 0, π/2, π, and 3π/2, and $|a\rangle$ and $|b\rangle$ denote time mode vectors of a reference pulse a and a reference pulse b transmitted by Bob, and become the basis vector of the state space in which the state transmitted by Alice is present.

In an ideal case, the state space of the BB84 state transmitted by Alice is a two-dimensional space with two time modes $|a\rangle$ and $|b\rangle$ as basis vectors. On the other hand, when the Faraday rotator mirror is imperfect, the state transmitted by Alice may be expressed as Equation 3 below.

$$|\Phi_k\rangle = \frac{1}{\sqrt{2}}\left(\sin(2\epsilon)e^{i2k\delta}|aH\rangle + \cos(2\epsilon)\,e^{ik\delta}|aV\rangle + \sin(2\epsilon)|bH\rangle + \cos(2\epsilon)|bV\rangle\right),$$

$$k = 0, 1, 2, 3$$

[Equation 4]

In [Equation 3], $|\Phi_k\rangle$ denotes a state space, $\epsilon$ denotes a rotation angle error caused by imperfection of the Faraday rotator mirror, $\delta$ denotes an index corresponding to the phase state selected by Alice, and $|aH\rangle$ denotes a time mode vector of a reference pulse a of horizontal polarization, $|bH\rangle$ denotes a time mode vector of a reference pulse a of horizontal polarization, and $|aV\rangle$ denotes a time mode vector of a reference pulse b of vertical polarization.

[Equation 3] shows that information encoded by Alice appears not only on time modes (e.g., a and b) but also on polarization modes (e.g., H and V). When substituting some terms to check the dimension of the state space more clearly in [Equation 3], [Equation 4] below is obtained.

$$|\Phi_k\rangle = \frac{1}{\sqrt{2}}\left[\sin(2\epsilon)\cos(2\epsilon)\left(e^{i2k\delta} - e^{ik\delta}\right)|x_1\rangle + \{\sin^2(2\epsilon)\,e^{i2k\delta} + \cos^2(2\epsilon)\,e^{ik\delta}\}|x_2\rangle + |x_3\rangle\right],$$

[Equation 4]

In [Equation 4], $|\Phi_k\rangle$ denotes a state space, $\epsilon$ denotes a rotation angle error caused by imperfection of the Faraday rotator mirror, $\delta$ denotes an index corresponding to the phase state selected by Alice, and $|x_1\rangle$, $|x_2\rangle$, $|x_3\rangle$ denotes substituted time mode vectors.

Figure 18:
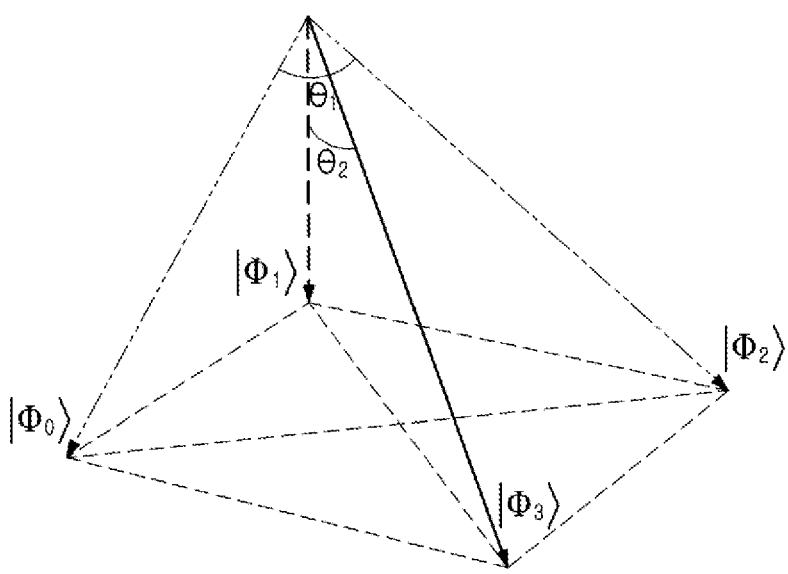
FIG. 18 illustrates an example of four states transmittable by Alice according to a PnP quantum key distribution scheme applicable to the present disclosure.

Referring to [Equation 4], the Hilbert space of information transmitted by Alice may be understood as a 3-dimensional space, not a 2-dimensional space anymore. If four types of information that may be transmitted from Alice are diagrammed in a 3D space, the four types of information may be expressed as shown in FIG. 18. FIG. 18 illustrates an example of four states transmittable by Alice according to a PnP quantum key distribution scheme applicable to the present disclosure. Referring to FIG. 18, four states $|\Phi_1\rangle$, $|\Phi_2\rangle$, $|\Phi_3\rangle$, and $|\Phi_4\rangle$ may be transmitted from Alice. Eve may distinguish the four states by finding a positive operator valued measure (POVM) operator that minimizes the qbit error rate between Alice and Bob for the four states expressed in [Equation 4], and a passive Faraday rotator mirror (PFM) attack that applies an intercept-resend attack based on the information on the distinguished states is possible.

POVM is one of the measurement basis design methods for distinguishing between non-orthogonal states. When desiring to distinguish n states, POVM is composed of n operators $M_0, M_1, \ldots, M_{n-1}$ corresponding to each state, and an operator $M_{vac}$ corresponding to the case where it is impossible to distinguish which state of n states it is in. Therefore, POVM for PFM attack may be expressed as $\{M_{vac}, M_k | k=0, 1, 2, 3\}$. If Eve obtains a measurement result corresponding to $M_i(i=0, 1, 2, 3)$, Eve generates a quantum in a $|\Phi i\rangle$ state and transmits it to Bob. On the other hand, if Eve obtains a result corresponding to $M_{vac}$, Eve does not transmit anything. At this time, in a situation where Eve's PFM attack is applied, when Alice transmits state information corresponding to $|\Phi k\rangle$, the probability that Bob obtains state information of $|\Phi j\rangle$ is as shown in [Equation 5] below.

$$P(j \mid k) = \sum_{i=0}^{3} P(B = j \mid E = i)P(E = i \mid A = k) =$$

[Equation 5]

$$\sum_{i=0}^{3} |\langle\Phi_j \mid \Phi_i\rangle|^2 Tr(M_i\rho_k) \quad \rho_k = |\Phi_k\rangle\langle\Phi_k|$$

In [Equation 5], P(j|k) denotes a probability that Bob obtains the state information of an index j when Alice transmits the state information of an index k, B denotes an index of the state information obtained by Bob, E denotes an index of the state information obtained by Eve, A denotes an index of the state information transmitted by Alice, $M_i$ denotes an operator corresponding to an i-th state, and $\rho_k$ denotes a product of the ket and bra of the state information of the index k.

In general, if Eve obtains a measurement result corresponding to $M_k(k=0, 1, 2, 3)$, it is considered that meaningful information is obtained, and Eve's success probability is are given as shown in [Equation 6] below.

$$P_{succ}^E = \frac{1}{4}\sum_{k=0}^{3}\sum_{j=0}^{3} P(j \mid k) = \frac{1}{4}\sum_{i=0}^{3} Tr(M_i\rho)$$

[Equation 6]

$$\rho = \rho_0 + \rho_1 + \rho_2 + \rho_3$$

In [Equation 6], $P_{succ}^E$ denotes an Eve's success probability, P(j|k) denotes a probability that Bob obtains the state information of the index j when Alice transmits the state information of the index k, $M_i$ is an operator corresponding to the i-th state, and $\rho$ denotes a sum of the products of ket and bra of the state information of each index.

FIG. 19 illustrates an Eve's success probability according to a rotation angle error in a Faraday rotator mirror applicable to the present disclosure. Eve's POVM is set to $M_k = x\rho^{-1/2}|E_k\rangle\langle E_k|\rho^{-1/2}$, where Ek is the eigenvector for the smallest value of the non-zero eigenvalues of $\rho^{-1/2}L_k\rho^{-1/2}$, and x is a maximum real number enabling $$M_{vac} = 1 - \sum_{k=0}^{3} M_k$$

to become a positive semi-definite matrix. A graph as shown in FIG. 19 may be determined by observing the success probability while changing $\epsilon$ from $-1°$ to $+1°$, which is a process error range of a commercially available Faraday rotator mirror. Referring to FIG. 19, as the absolute value of $\epsilon$ increases, the probability of Eve succeeding in the PFM attack increases, and considering the rotation angle variation according to the temperature or wavelength, the absolute value of $\epsilon$ may increase to a range greater than $1°$ given as a process error. Accordingly, the risk of eavesdropping may be more serious than shown in the graph of FIG. 19.

As described above, due to the distortion of the state space due to imperfection of the Faraday rotator mirror, the state of information transmitted from Alice may no longer follow the state of the BB84 protocol. In this case, the three-dimensionally distorted state space provides Eve with a security loophole and enables PFM attacks. Therefore, there is a need for an alternative to maintain the inherent security of the BB84 protocol even in the PnP quantum key distribution scheme by allowing Alice and Bob to defend against such a PFM attack. Accordingly, the present disclosure proposes a technique for correcting distortion due to imperfection of a Faraday rotator mirror.

Specifically, the present disclosure relates to a PnP measurement device independent (MDI) QKD scheme based on bell state measurement (BSM), and proposes a technique for simultaneously and instantaneously detecting and correcting rotation angle errors of a Faraday rotator mirror while processing a pulse train for generating a cryptographic key. In the present disclosure, both Alice and Bob act as transmitters that encode and transmit quantum state information, and Charlie, a third node, receives the quantum transmitted from Alice and Bob and performs BSM. In the case of the conventional PnP QKD scheme based on the preparation-measurement method in which Alice prepares and transmits bit information and Bob receives and measures bit information, a structure in which a pulse with vertical polarization and a pulse with horizontal polarization are alternately transmitted is used as a pulse train for generating the cryptographic key. However, in the system according to various embodiments, since the pulse train for generating the cryptographic key may be composed of only a pulse with one polarization state, instantaneous correction that detects and corrects errors using the pulse train for generating the cryptographic key itself may be performed.

FIG. 20 illustrates a system supporting quantum key distribution according to an embodiment of the present disclosure. In other words, FIG. 20 illustrates a configuration of devices included in the PnP MDI QKD system proposed in the present disclosure. A system according to various embodiments may be operated based on a time-bin phase encoding scheme. A receiver includes a light source and an SPD, and a transmitter includes a component for encoding bit information. Both Alice 2020 and Bob 2010 operate as transmitters and may have the same device configuration. Specifically, Alice 2020 includes an encoder 2022, a corrector 2024, and a variable Faraday rotator mirror (VFM) 2026. Although not shown in FIG. 20, Alice 2020 may further include a control circuit for controlling operation of a VFM 2026. For example, according to an embodiment, the control circuit may control the rotation angle of the VFM 2026 based on information determined by the operation of the corrector 2024. Charlie 2030 operates as a receiver, and includes a time bin generator 2032 for generating a time-bin and transmits it to Alice 2020 and/or Bob 2010, and a BSM unit 2034 for receiving quantum information from Alice 2020 and/or Bob 2010 and performing BSM. Detailed configurations of Alice 2020 and Charlie 2030 are shown in FIGS. 21 and 22 below.

Figure 21:
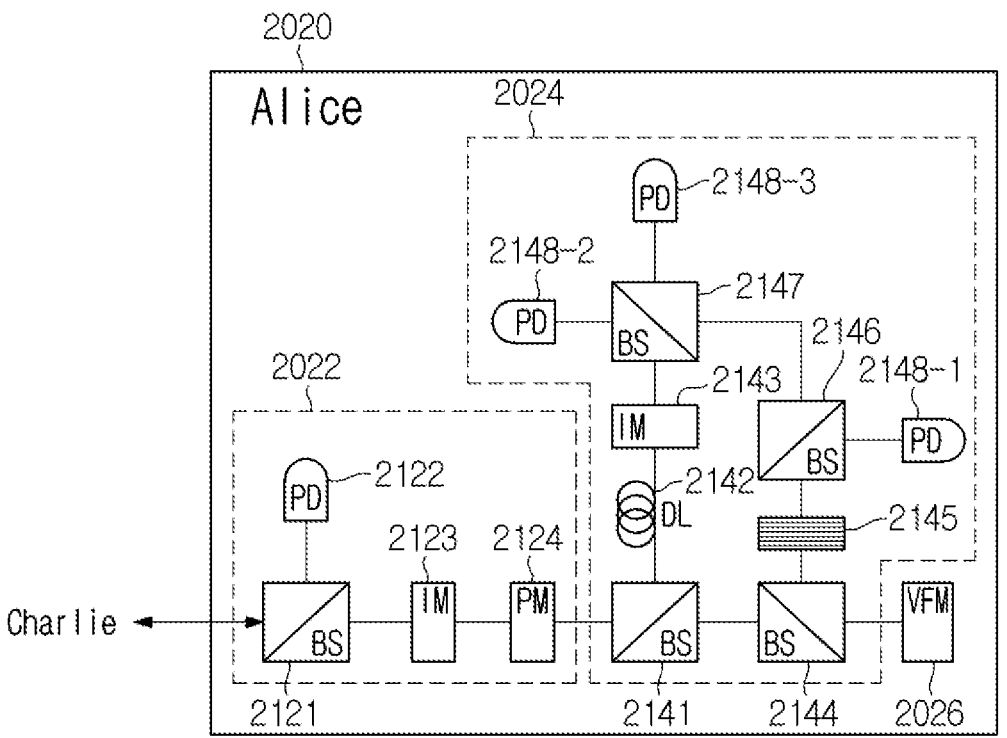
FIG. 21 illustrates a configuration of a device operating as Alice in a communication system according to an embodiment of the present disclosure.

FIG. 21 illustrates a configuration of a device operating as Alice in a communication system according to an embodiment of the present disclosure. Referring to FIG. 21, the device includes an encoder 2022 including a beam splitter (BS) 2121, a photodiode (PD) 2122, an intensity modulator (IM) 2123 and a phase modulator 2124, a corrector 2024 including a BS 2141, a delay line (DL) 2142, an IM 2143, a BS 2144, a polarizer 2145, a BS 2146, a BS 2147, a PD 2148-1, a PD 2148-2 and a PD 2148-3, and a VFM 2026.

Figure 22:
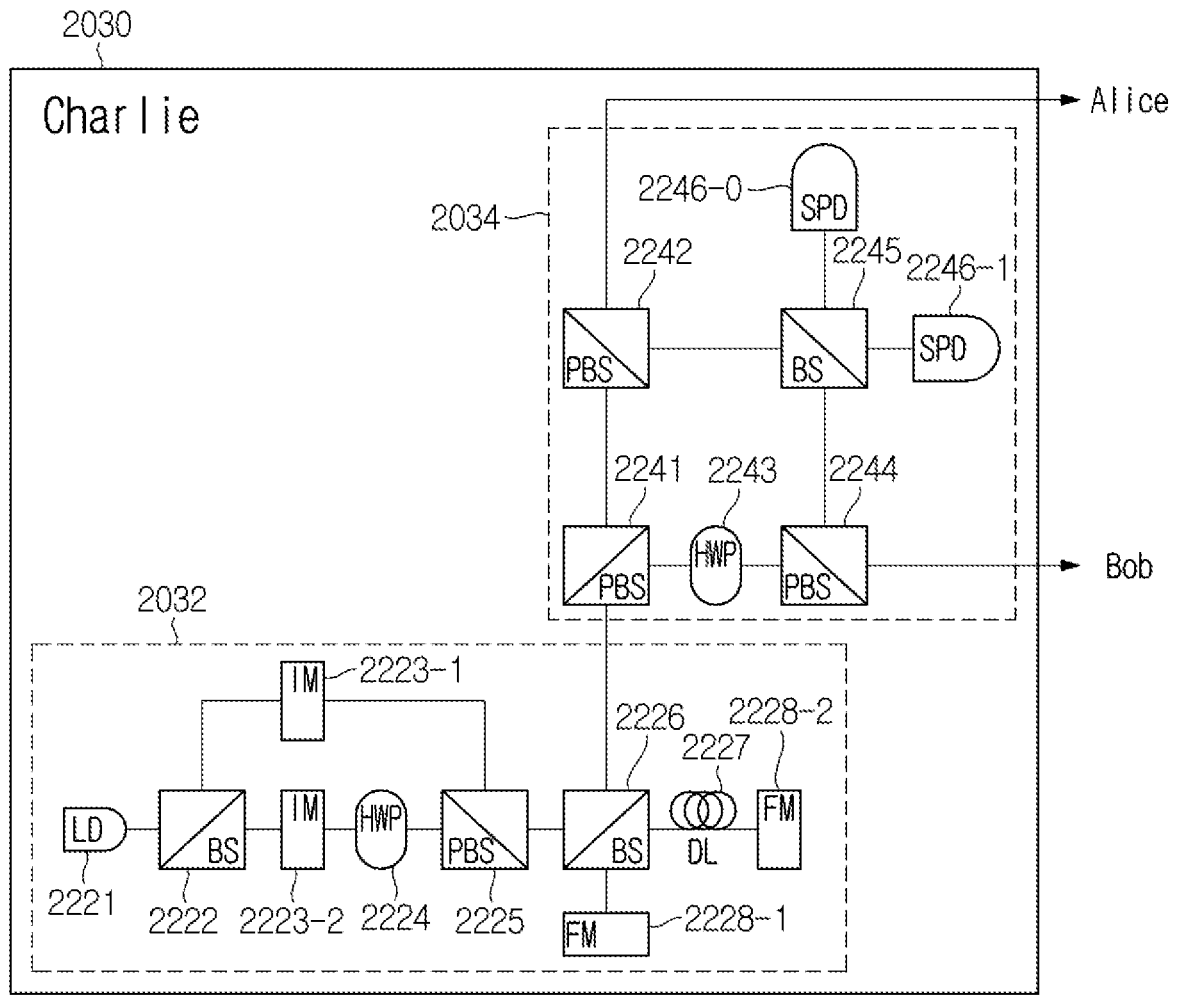
FIG. 22 illustrates a configuration of a device operating as Charlie in a communication system according to an embodiment of the present disclosure.

FIG. 22 illustrates a configuration of a device operating as Charlie in a communication system according to an embodiment of the present disclosure. Referring to FIG. 22, the device includes a time bin generator 2032 including a laser diode (LD) 2221, a BS 2222, an IM 2223-1, an IM 2223-2, a half wave plate (HWP) 2224, a polarizing beam splitter (PBS) 2225, a BS 2226, a DL 2227, a Faraday rotator mirror (FM) 2228-1 and an FM 2228-2, and a BSM unit 2034 including a PBS 2241, a PBS 2242, a HWP 2243, a PBS 2244, a BS 2245, a single photon detector (SPD) 2246-1, and an SPD 2246-2.

The overall flow of the quantum key distribution protocol according to an embodiment based on the configurations illustrated in FIGS. 20 to 22 is described as follows.

1. Charlie 2030 transmits a pulse including two time bins including a signal bin and a reference bin to Alice 2020 and Bob 2010, respectively.

1) The LD 2221 of the time bin generator 2032 generates a pulse with constant polarization (e.g., vertical polarization).

2) The generated pulse is split into two pulses in the BS 2222. One of the two pulses passes through an upper path including the IM 2223-1, and the other passes through a lower path including the IM 2223-2 and the HWP 2224. A pulse, which has passed through the lower path, is polarization-rotated by 90° by the HWP 2224, so that it has a horizontal polarization state.

3) The PBS 2225 reflects a vertical polarization pulse and transmits a horizontal polarization pulse. Accordingly, both the two pulses incident from the upper path and the lower path are transferred to the Michelson interferometer (e.g., the BS 2226, the FM 2129-1, and the FM 2129-2).

4) The Michelson interferometer splits each of the vertical polarization pulse and the horizontal polarization pulse into two bins, and assigns time delay to one of the two bins through the DL 2227, thereby generating the two time bins for each polarization state. Here, the fast time bin is referred to as a 'reference bin' and the slow time bin is referred to as a 'signal bin'. Accordingly, four bins are generated: a reference bin of vertical polarization, a signal bin of vertical polarization, a reference bin of horizontal polarization, and a signal bin of horizontal polarization.

5) Two time bins of horizontal polarization pass through both PBSs 2241 and 2242 and then are transferred to Alice 2020. The two time bins of vertical polarization are reflected from the PBS 2241, converted into horizontal polarization by the HWP 2243, transmitted through the PBS 2244, and transferred to Bob 2010.

2. Alice 2020 and Bob 2010 each perform error correction. Since Alice 2020 and Bob 2010 operate identically, operation of Alice 2020 is described in the present disclosure. Alice 2020 may branch at least some of the received pulses to the corrector 2024 once before input to the VFM 2026 and after reflection from the VFM, and perform error correction of the VFM 2026 through the branched components. In the following description, a component branched to the corrector 2024 before input to the VFM 2026 is referred to as a 'first component', and a component that branched to the corrector 2024 after reflection from the VFM 2026 is referred to as a 'second component'.

1) The first component is used as a reference for the phase of an original signal, and the second component includes information on the rotation angle error in the process of being reflected back from the VFM 2026.

2) A path difference between the first component and the second component is canceled by the DL 2142, and the polarizer 2145 is set to a horizontal polarization state so that only the component generated by the error of the VFM 2026 with respect to the second component passes through the polarizer 2145.

3) Among the second components, the magnitude of an error component (hereinafter referred to as 'third component'), which has passed through the polarizer 2145, is measured by the PD 2148-1. The IM 2143 included in the movement path of the first component adjusts the magnitude of the first component so that the magnitude of the first component is the same as that of the third component. Hereinafter, the adjusted first component is referred to as a 'fourth component'.

4) The third component and the fourth component are simultaneously input to the BS 2147 to cause interference. Accordingly, a first interference component and a second interference component are formed.

5) Each of the first interference component and the second interference component is input to a balanced photo detector (BPD) composed of PDs 2148-2 and 2148-3, and the BPD may measure the error information (e.g., magnitude and sign of error) of the VFM 2026.

6) Correction current is generated based on the measured error information. When the correction current is input to the VFM 2026, the rotation angle error may be corrected by the induced magnetic field. Specifically, the VFM 2026 includes a permanent magnet, a solenoid, and a mirror, and the correction current controls the current flowing through the solenoid. By adding the induced magnetic field value of the solenoid by the correction current to the magnetic field of the permanent magnet, the entire magnetic field of the VFM 2026 is formed. Since the rotation angle of the pulse reflected from the VFM 2026 is determined according to the value of the entire magnetic field, the rotation angle of the VFM 2026 may be adjusted by changing the correction current.

3. Alice 2020 randomly selects one from among the Z basis (e.g., time-bin encoding) and X basis (e.g., phase encoding) for components returned to the encoder 2022 after reflection from the VFM 2026 of the received pulses, encodes bit information based on the selected basis and transmits it to Charlie 2030.

1) Z-basis encoding is performed by the IM 2123, and 0 or 1 may be encoded by blocking one of the two time bins. At this time, the encoding state of Alice 2020 and Bob 2010 may be as shown in [Table 4] below.

TABLE 4

| apparatus | state |
|---|---|
| Alice | $|1\rangle_{a_r}|0_{a_s}$ or $|0\rangle_{a_r}|1\rangle_{a_s}$ |
| Bob | $|1\rangle_{b_r}|0\rangle_{b_s}$ or $|0\rangle_{b_r}|1\rangle_{b_s}$ |

2) X-basis encoding is performed by the PM 2124 and 0 or 1 may be encoded by applying a relative phase difference of two time bins with 0 or π. At this time, the encoding state of Alice 2020 and Bob 2010 may be as shown in [Table 5] below.

TABLE 5

| apparatus | state |
|---|---|
| Alice | $\frac{1}{\sqrt{2}}(|1\rangle_{a_r}|0\rangle_{a_s} + e^{i\theta_a}|0\rangle_{a_r}|1\rangle_{a_s}), \theta_a \in \{0, \pi\}$ |

TABLE 5-continued

| apparatus | state |
|---|---|
| Bob | $\frac{1}{\sqrt{2}}(|1\rangle_{b_r}|0\rangle_{b_s} + e^{i\theta_b}|0\rangle_{b_r}|1\rangle_{b_s}), \theta_b \in \{0, \pi\}$ |

In order to equally maintain the mean photon number of quantum states output for the Z basis and the X basis, the pulse is adjusted using the IM 2123 after phase encoding for the X basis. Therefore, even in the case of X-basis encoding, a pulse is stochastically represented in a superimposed form in which only one of two time bins is present. This random time bin selection may not operate as information in the BSM result for X-basis encoding.

4. Charlie 2030 performs BSM on pulses transmitted by Alice 2020 and Bob 2010, and shares the result of BSM through a public channel. The BSM performed by Charlie 2030 may be understood as a partial bell state measurement (partial BSM) process for discriminating two bell states as shown in [Equation 7] below.

$$|\psi^\pm\rangle = \frac{1}{\sqrt{2}}\left(|1\rangle_{a_r}|0\rangle_{a_s}|0\rangle_{b_r}|1\rangle_{b_s} \pm |0\rangle_{a_r}|1\rangle_{a_s}|1\rangle_{b_r}|0\rangle_{b_s}\right) \qquad \text{[Equation 7]}$$

In [Equation 7], $|\Psi\pm\rangle$ denotes a quantum state corresponding to the partial BSM result, $|x\rangle_{a_r}$ denotes the state of the reference bin encoding x in Alice, and $|x\rangle_{a_s}$ denotes the state of the signal bin encoding x in in Alice, $|x\rangle_{b_r}$ denotes the state of the reference bin encoding x in Bob, and $|x\rangle_{b_s}$ denotes the state of the signal bin encoding x in Bob.

$|\Psi^\pm\rangle$ corresponding to a successful partial BSM result is composed of a linear combination of $|1\rangle_{a_r}|0\rangle_{a_s}|0\rangle_{b_r}|1\rangle_{b_s}$ and of $|0\rangle_{a_r}|1\rangle_{a_s}|1\rangle_{b_r}|1\rangle b_s$ among tensor product form combinations of states transmitted from Alice 2020 and Bob 2010. When each combination is input to the BS 2245 performing partial BSM, the interference components respectively reaching SPD #0 2246-0 and SPD #1 2246-1 may be arranged as in Equation 8 below.

$$|1\rangle_{a_r}|0\rangle_{a_s}|0\rangle_{b_r}|1\rangle_{b_s}=|1\rangle_{a_r}|0\rangle_{b_r}|0\rangle_{a_s}|1\rangle_{b_s}\Rightarrow$$
$$(|0\rangle_{r_0}|1\rangle_{r_1}+|1\rangle_{r_0}|0\rangle_{r_1})(-|0\rangle_{s_0}|1\rangle_{s_1}+$$
$$|1\rangle_{s_0}|0\rangle_{s_1})\Rightarrow -|0101\rangle +|0110\rangle -|1001\rangle +$$
$$|1010\rangle|_{r_0r_1s_0s_1}|0\rangle_{a_r}|1\rangle_{a_s}|1\rangle_{b_r}=|0\rangle_{b_s}=$$
$$|0\rangle_{a_r}|1\rangle_{b_r}|0\rangle_{b_s}\Rightarrow(-|0\rangle_{r_0}|1\rangle_{r_1}+$$
$$|1\rangle_{r_0}|0\rangle_{r_1})(|0\rangle_{s_0}|1\rangle_{s_1}+|1\rangle_{s_0}|0\rangle_{s_1})\Rightarrow$$
$$-|0101\rangle -|0110\rangle +|1001\rangle +|1010\rangle|_{r_0r_1s_0s_1} \qquad \text{[Equation 8]}$$

In [Equation 8], $|x\rangle_{a_r}$ denotes the state of the reference bin encoding x in Alice, $|x\rangle_{a_s}$ denotes the state of the signal bin encoding x in Alice, $|x\rangle_{b_r}$ denotes the state of the reference bin encoding x in Bob, $|x\rangle_{b_s}$ means the state of the signal bin encoding x in Bob. In $|x\rangle_{r_0}$, $|x\rangle_{r_1}$, $|x\rangle_{s_0}$, $|x\rangle_{s_1}$, the subscripts r and s respectively denote the measurement results for the reference time bin and signal time bin, and the subscripts 0 and 1 respectively denotes that it is the result detected by SPD #0 2246-0 and SPD #1 2246-1. The detection result of $|\Psi^\pm\rangle$ is summarized in [Equation 9] below.

$$|\psi^+\rangle = \frac{1}{\sqrt{2}}(|1010\rangle -|0101\rangle)\big|_{r_0r_1s_0s_1} \qquad \text{[Equation 9]}$$

$$|\psi^-\rangle = \frac{1}{\sqrt{2}}(|0110\rangle -|1001\rangle)\big|_{r_0r_1s_0s_1}$$

In [Equation 9], $|\Psi^+\rangle$ denotes a state when two time bins are detected in the same SPD, and $|\Psi^-\rangle$ denotes a state when two time bins are detected in different SPDs.

As a result, a successful partial BSM result corresponds to the case where detection is performed in each of the SPD 2246-0 or 2946-1 in both time bins, $|\Psi^+\rangle$ corresponds to a case where two time bins are detected in the same SPD 2246-0 or 2946-1, $|\Psi^-\rangle$ corresponds to the case where two time bins are detected inn different SPDs 2246-0 and 2946-1.

Hereinafter, a partial BSM process will be described through a mathematical analysis for the case where the above-mentioned two quantum state combinations appear with respect to the Z basis and the X basis.

1) Analysis of Partial BSM Results for Z-Basis Encoding

In the encoding method using the Z basis, the quantum state combination constituting $|\Psi^\pm\rangle$ corresponds to the case where Alice 2020 and Bob 2010 block different time bins. This means that Alice 2020 and Bob 2010 transmit different bit information among 0 and 1 both when $|\Psi^+\rangle$ is measured and when $|\Psi^-\rangle$ is measured.

2) Analysis of Partial BSM Results for X-Basis Encoding

In the encoding method using the X basis, the combination of quantum states transmitted by Alice 2020 and Bob 2010 may be expressed in the form of a tensor product as shown in [Equation 10] below.

$$
(|1\rangle_{a_r}|0\rangle_{a_s} + e^{i\theta_a}|0\rangle_{a_r}|1\rangle_{a_s})(|1\rangle_{b_r}|0\rangle_{b_s} +
$$
$$
e^{i\theta_b}|0\rangle_{b_r}|1\rangle_{b_s}) = |1\rangle_{a_r}|0\rangle_{a_s}|0\rangle_{b_s} +
$$
$$
e^{i\theta_b}|1\rangle_{a_r}|0\rangle_{a_s}|0\rangle_{b_r}|1\rangle_{b_2} +
$$
$$
e^{i\theta_a}|0\rangle_{a_r}|1\rangle_{a_s}|1\rangle_{b_r}|0\rangle_{b_s} +
$$
$$
e^{i(\theta_a + 74\,b)}|0\rangle_{a_r}|1\rangle_{a_s}|0\rangle_{b_r}|1\rangle_{b_s} \qquad \text{[Equation 10]}
$$

In [Equation 10], $|x\rangle_{a_r}$ denotes the state of the reference bin encoding x in Alice, $|x\rangle_{a_s}$ denotes the state of the signal bin encoding x in Alice, $|x\rangle_{b_r}$ denotes the state of the reference bin encoding x in Bob, $\|x\rangle_{b_s}$ denotes the state of the signal bin encoding x in Bob, $\theta_a$ denotes the phase information encoded in Alice, and $\theta_b$ denotes the phase information encoded in Bob.

The quantum state combination constituting $|\Psi^\pm\rangle$ is composed of the second and third terms of [Equation 10]. At this time, according to the relationship between the phase information $\theta_a$ and $\theta_b$ encoded by Alice 2020 and Bob 2010, one of two results of $|\Psi^+\rangle$ and $|\Psi^-\rangle$ may be measured.

In the case of $\theta_a - \theta_b = 0$, the quantum state combination may be summarized as $|1\rangle_{a_r}|0\rangle_{a_s}|0\rangle_{b_r}|1\rangle_{b_s} + |0\rangle_{a_r}|1\rangle_{a_s}|1\rangle_{b_r}|0\rangle_{b_s}$, which is consistent with $|\Psi^+\rangle$ defined at the beginning of step 4. Similarly, in the case of $\theta_a - \theta_b = \pi$, the quantum state combination may be summarized as $|1\rangle_{a_r}|0\rangle_{a_s}|0\rangle_{b_r}|1\rangle_{b_s} - |0\rangle_{a_r}|1\rangle_{a_s}|1\rangle_{b_r}|0\rangle_{b_s}$, which is consistent with $|\Psi^-\rangle$ defined at the beginning of step 4. Here, terms commonly multiplied by each term are omitted.

In summary, measuring $|\Psi^+\rangle$ means that Alice 2020 and Bob 2010 encoded the same phase information, and measuring $|\Psi^-\rangle$ means that Alice 2020 and Bob 2010 encoded different phase information.

5. Alice 2020 and Bob 2010 share the selected basis through a public channel.
6. Alice 2020 and Bob 2010 select the same basis, and for the case where the BSM result is successful (e.g., $|\Psi^+\rangle$ or $|\Psi^-\rangle$), a sifted key is obtained by performing bit flip according to the BSM result. Whether to perform bit flip according to the BSM result is shown in [Table 6] below.

TABLE 6

| | BSM result $|\Psi^-\rangle$ | BSM result $|\Psi^+\rangle$ |
|---|---|---|
| Z base | Bit flip | Bit flip |
| X base | Bit flip | No bit flip |

7. Alice 2020 and Bob 2010 may obtain a final cryptographic key by performing a post-processing process.

Figure 23:
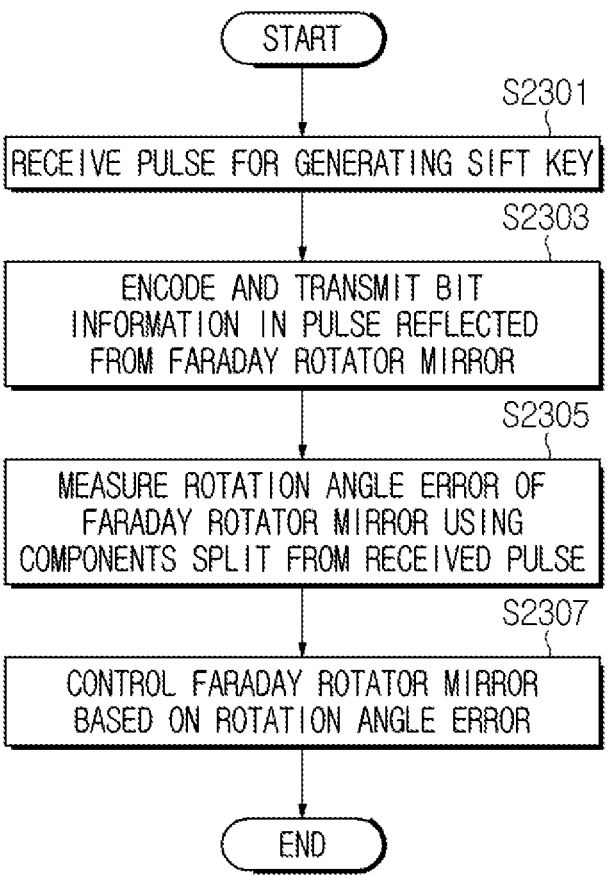
FIG. 23 illustrates an example of a procedure for generating a sift key using a Faraday rotator mirror in a communication system according to an embodiment of the present disclosure.

FIG. 23 illustrates an example of a procedure for generating a sift key using a Faraday rotator mirror in a communication system according to an embodiment of the present disclosure. FIG. 23 illustrates a method of operating a device (e.g., terminal, base station, core entity, etc.) operating as Alice or Bob.

Referring to FIG. 23, in step S2301, the device receives a pulse for generating a sift key. The pulse contains at least one photon and is received through a quantum channel. For example, the pulse may be received from another device operating as a Charlie of the PnP quantum key distribution scheme and may correspond to one of two time bins including a reference bin and a signal bin.

In step S2303, the device encodes bit information in a pulse reflected from the Faraday rotator mirror and transmits the encoded pulse. That is, the device encodes bit information in the reflected pulse after the pulse received in step S2301 is reflected from the Faraday rotator mirror. For example, the device may select one of a plurality of candidate basis (e.g., a time-bin encoding basis and a phase encoding basis) and encode bit information based on the selected basis. Then, the device transmits the pulse, in which bit information is encoded, through a quantum channel.

In step S2305, the device measures a rotation angle error of the Faraday rotator mirror using components split from the received pulse. The components used to measure the rotation angle error are split multiple times before the pulse is received, reflected from the Faraday rotator mirror, and transmitted. At least one of the components includes rotation angle error information of the Faraday rotator mirror. For example, one of the components may be obtained from the pulse before being reflected from the Faraday rotator mirror and the other may be obtained from the pulse that is reflected from the Faraday rotator mirror.

In step S2307, the device controls the Faraday rotator mirror based on the rotation angle error. For example, the device adjusts the rotation angle of the Faraday rotator mirror based on the rotation angle error. Presence of the rotation angle error means that the rotation angle of the Faraday rotator mirror is not 90°. Accordingly, the device may generate a correction value of the rotation angle and apply a control signal corresponding to the correction value to the Faraday rotator mirror so as to provide a rotation angle of 90° within a tolerance range.

Although not shown in FIG. 23, the device may control the Faraday rotator mirror based on the rotation angle error, encode bit information in a pulse, and transmit the pulse, in which the bit information is encoded, through a quantum channel. In other words, the device may transmit the pulse containing bit information through a quantum channel. In this case, the pulse carrying the bit information may be the same as the pulse used to measure the rotation angle error. That is, according to various embodiments, the rotation angle error may be estimated and corrected using a pulse exchanged for quantum key distribution, rather than a signal for separately measuring the rotation angle error.

Figure 24:
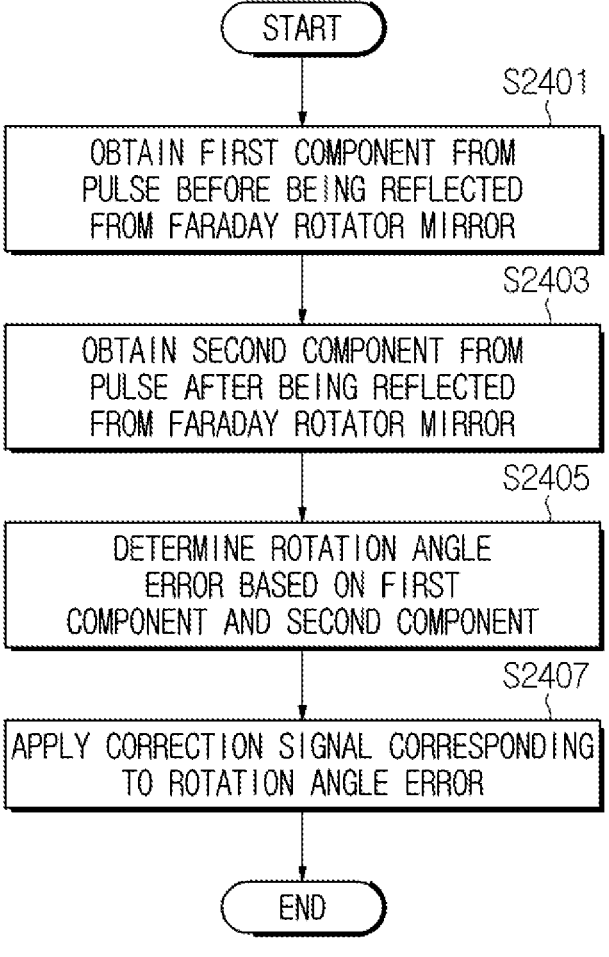
FIG. 24 illustrates an example of a procedure for correcting a rotation angle error of a Faraday rotator mirror in a communication system according to an embodiment of the present disclosure.

FIG. 24 illustrates an example of a procedure for correcting a rotation angle error of a Faraday rotator mirror in a communication system according to an embodiment of the present disclosure. FIG. 24 illustrates a method of operating a device (e.g., a terminal, a base station, a core entity, etc.) including a Faraday rotator mirror.

Referring to FIG. 24, in step S2401, the device obtains a first component from a pulse before being reflected from a Faraday rotator mirror. For example, before a pulse received from another device is input to a Faraday rotator mirror, the device may split the pulse using a beam splitter. Here, the received pulse includes a pulse transmitted from another device to generate a sift key.

In step S2403, the device obtains a second component from the pulse after being reflected from the Faraday rotator mirror. The second component may be obtained by splitting from the pulse used to split the first component. However, the second component is obtained by splitting the pulse after being reflected from the Faraday rotator mirror. Due to this, the rotation angle of the second component may include the rotation angle error of the Faraday rotator mirror.

In step S2405, the device determines the rotation angle error based on the first component and the second component. First, the device may perform polarization filtering on the second component to extract a third component, which is an error component, from the second component. Here, the error component means a component having the same polarization as the first component. That is, through polarization filtering, the device extracts the same polarization component as the first component from the second component. In addition, based on a time difference between acquisition of the first component and acquisition of the second component, the device time-delays the first component. The device may then measure the magnitude of the third component and adjust the magnitude of the first component to the measured magnitude, thereby generating a fourth component. Next, the device may generate a first interference component and a second interference component by causing interference between the third component and the fourth component, and estimate the rotation angle error using the first interference component and the second interference component.

In step S2407, the device applies a correction signal corresponding to the rotation angle error. In other words, the device may generate a control signal for correcting the rotation angle of the Faraday rotator mirror by the rotation angle error, and apply the control signal to the Faraday rotator mirror. Accordingly, since the next pulse, the Faraday rotator mirror will provide a corrected rotation angle.

As in the various embodiments described above, a rotation angle error of the Faraday rotator mirror may be corrected. The above-described procedure for correcting the rotation angle error may be performed at various times, such as when a sift key is first generated or when a sift key is renewed. For example, when a sift key is changed while communication is performed by initially generating and using the sift key, the above-described correction procedure may be performed using a pulse received to generate a new sift key. Also, since a plurality of pulses may be used even in a process of generating one sift key, the above-described correction process may be performed multiple times within a process of generating one sift key. In this case, how frequently to measure and correct the rotation angle error may be adaptively adjusted based on at least one of characteristics of the Faraday rotator mirror, a state of the device, or a communication environment.

Application Example of Embodiment

In a communication system, devices may generate a sift key by performing a quantum key distribution procedure. In this case, according to various embodiments described above, the device operating as Alice or Bob may correct a rotation angle error of the Faraday rotator mirror. A quantum key distribution procedure including a correction operation for rotation angle error may be applied to communication between various devices. For example, in communication between a base station and a terminal, a procedure for correcting a rotation angle error of a Faraday rotator mirror according to various embodiments described above may be performed. An example of operations of a base station and a terminal to which a correction procedure for a rotation angle error according to various embodiments is applied is illustrated in FIG. 25 below.

Figure 25:
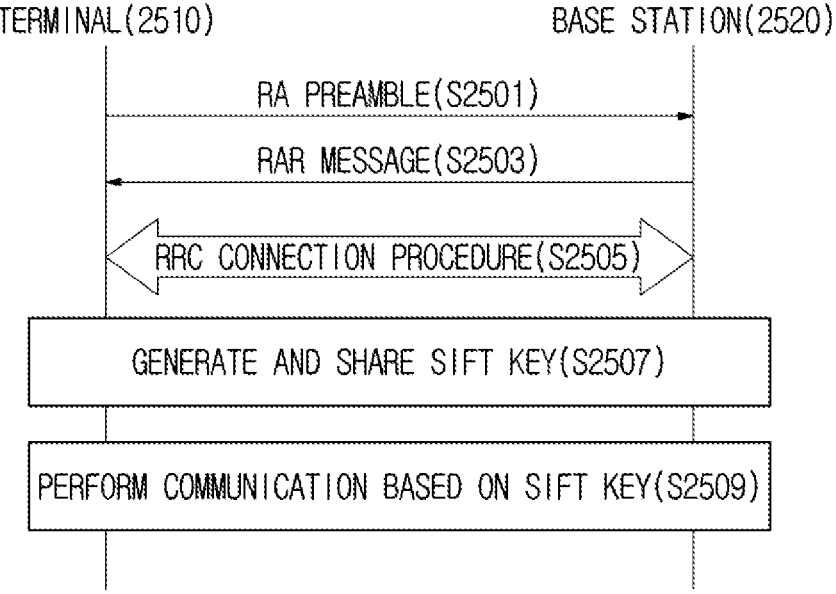
FIG. 25 illustrates an example of a procedure for correcting a rotation angle error of a Faraday rotation mirror in a communication system according to an embodiment of the present disclosure.

FIG. 25 illustrates an example of a procedure for correcting a rotation angle error of a Faraday rotation mirror in a communication system according to an embodiment of the present disclosure. FIG. 25 illustrates signal exchange between a terminal 2510 and a base station 2520.

Referring to FIG. 25, in step S2501, the terminal 2510 transmits a random access (RA) preamble to the base station 2520. The RA preamble is transmitted through a RACH established by the base station 2520, and information on the RACH (e.g., resource location, etc.) may be obtained from system information broadcast by the base station 2520.

In step S2503, the base station 2520 transmits a random access response (RAR) message to the terminal 2510. That is, the terminal 2510 may receive the RAR from the base station 2520 as a response to the RA preamble.

In step S2505, the terminal 2510 and the base station 2520 perform an RRC connection procedure. To this end, at least one message related to RRC connection establishment between the terminal 2510 and the base station 2520 may be transmitted and received. Through this, an RRC layer connection between the terminal 2510 and the base station 2520 may be established.

In step S2507, the terminal 2510 and the base station 2520 generate and share a sift key. For example, the terminal 2510 and the base station 2520 may generate a sift key based on the PnP MDI QKD scheme. In this case, the terminal 2510 and the base station 2520 may operate as Alice and Bob, and a third device operating as Charlie may further be present. Alternatively, base station 2520 or another base station may play the role of Charlie. In this case, according to various embodiments, at least one of the terminal 2510 or the base station 2520 may estimate the rotation angle error of the Faraday rotator mirror and compensate for the rotation angle error. For example, at least one of the terminal 2510 and the base station 2520 may perform the procedure illustrated in FIG. 23 or 24.

In step S2509, the terminal 2510 and the base station 2520 perform communication based on the sift key. The sift key generated in step S2507 may be used in various ways. According to various embodiments, the sift key may be used as at least one of an encryption key for data, a seed value used to process data or a signal, and a value used to determine the seed value.

Examples of the above-described proposed methods may be included as one of the implementation methods of the present disclosure and thus may be regarded as kinds of proposed methods. In addition, the above-described proposed methods may be independently implemented or some of the proposed methods may be combined (or merged). The rule may be defined such that the base station informs the UE of information on whether to apply the proposed methods (or information on the rules of the proposed methods) through a predefined signal (e.g., a physical layer signal or a higher layer signal).

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

The embodiments of the present disclosure are applicable to various radio access systems. Examples of the various radio access systems include a $3^{rd}$ generation partnership project (3GPP) or 3GPP2 system.

The embodiments of the present disclosure are applicable not only to the various radio access systems but also to all technical fields, to which the various radio access systems are applied. Further, the proposed methods are applicable to mmWave and THzWave communication systems using ultrahigh frequency bands.

Additionally, the embodiments of the present disclosure are applicable to various applications such as autonomous vehicles, drones and the like.

What is claimed is:

1. A method performed by a first device in a communication system, the method comprising:

transmitting, to a second device, a random access (RA) preamble;

receiving, from the second device, a random access response (RAR) message as a response to the RA preamble;

performing a radio resource control (RRC) connection procedure with the second device;

generating a key for communication with the second device; and performing communication through a radio channel with the second device using the key, wherein the key comprises a sift key for quantum cryptography communication and the key is generated by using a pulse for cryptographic key exchange, and wherein the pulse for cryptographic key exchange is used to measure a rotation angle error of a Faraday rotator mirror based on a first component obtained from the pulse before being reflected from the Faraday rotator mirror and a second component obtained from the pulse after being reflected from the Faraday rotator mirror.

2. The method of claim 1, wherein the generating the key comprises:

receiving the pulse for the cryptographic key exchange through a quantum channel;

encoding and transmitting bit information in the pulse after the pulse is reflected from the Faraday rotator mirror;

measuring the rotation angle error of the Faraday rotator mirror using the first component and the second component split from the pulse; and adjusting a magnetic intensity of the Faraday rotator mirror using the rotation angle error.

3. The method of claim 2, wherein the measuring the rotation angle error comprises determining the rotation angle error included in the second component based on the first component.

4. The method of claim 2, wherein the measuring the rotation angle error comprises:

generating a third component corresponding to the rotation angle error from the second component;

generating a fourth component corresponding to a reference from the first component; and determining the rotation angle error based on the third component and the fourth component.

5. The method of claim 4, wherein the generating the third component comprises, extracting the same polarization component as the first component from the second component.

6. The method of claim 4, wherein the generating the fourth component comprises:

measuring a magnitude of the third component; and adjusting a magnitude of the first component based on the magnitude of the third component.

7. The method of claim 4, wherein the determining the rotation angle error based on the third component and the fourth component comprising:

generating a first interference component and a second interference component by causing interference between the third component and the fourth component; and determining a magnitude and sign of the rotation angle error using the first interference component and the second interference component.

8. The method of claim 2, further comprising:

encoding bit information in a pulse that is reflected from the Faraday rotator mirror and provides the second component; and transmitting the pulse including the bit information to the second device through the quantum channel.

9. The method of claim 8, wherein the encoding is performed based on a basis selected from among a plurality of candidate basis including a time-bin encoding basis and a phase encoding basis.

10. The method of claim 9, further comprising:

transmitting information related to the selected basis through the radio channel.

11. The method of claim 1, wherein the communication through the radio channel with the second device comprises at least one of data encryption using the sift key or signal processing based on a seed value generated based on the sift key.

12. A first device in a communication system, comprising:

a transceiver; and a processor connected to the transceiver and is configured to:

transmit, to a second device, a random access (RA) preamble;

receive, from the second device, a random access response (RAR) message as a response to the RA preamble;

perform a radio resource control (RRC) connection procedure with the second device;

generate a key for communication with the second device; and perform communication through a radio channel with the second device using the key, wherein the key comprises a sift key for quantum cryptography communication and the key is generated by using a pulse for cryptographic key exchange, and wherein the pulse for cryptographic key exchange is used to measure a rotation angle error of a Faraday rotator mirror based on a first component obtained from the pulse before being reflected from the Faraday rotator mirror and a second component obtained from the pulse after being reflected from the Faraday rotator mirror.

13. The first device of claim 12, wherein the processor is further configured to:

receive the pulse for the cryptographic key exchange through a quantum channel;

encode and transmit bit information in the pulse after the pulse is reflected from the Faraday rotator mirror;

measure the rotation angle error of the Faraday rotator mirror using the first component and the second component split from the pulse; and adjust a magnetic intensity of the Faraday rotator mirror using the rotation angle error.

14. The first device of claim 13, wherein the processor is further configured to:

determine the rotation angle error included in the second component based on the first component.

15. The first device of claim 13, wherein the processor is further configured to:

generate a third component corresponding to the rotation angle error from the second component;

generate a fourth component corresponding to a reference from the first component; and determine the rotation angle error based on the third component and the fourth component.

16. The first device of claim 15, wherein the generating the third component comprises, extracting the same polarization component as the first component from the second component.

17. The first device of claim 15, wherein the processor is further configured to:

measure a magnitude of the third component; and adjust a magnitude of the first component based on the magnitude of the third component.

18. The first device of claim 17, wherein the processor is further configured to:

generate a first interference component and a second interference component by causing interference between the third component and the fourth component; and determine a magnitude and sign of the rotation angle error using the first interference component and the second interference component.

19. The first device of claim 13, wherein the processor is further configured to:

encode bit information in a pulse that is reflected from the Faraday rotator mirror and provides the second component; and transmit the pulse including the bit information to the second device through the quantum channel.

20. The first device of claim 13, wherein the communication through the radio channel with the second device comprises at least one of data encryption using the sift key or signal processing based on a seed value generated based on the sift key.

* * * * *